(12) United States Patent
Li et al.

(10) Patent No.: US 10,840,698 B2
(45) Date of Patent: Nov. 17, 2020

(54) LEAKAGE CURRENT DETECTION AND PROTECTION DEVICE FOR POWER CORD

(71) Applicant: Chengli Li, Suzhou (CN)

(72) Inventors: Chengli Li, Suzhou (CN); Shengyun Nie, Suzhou (CN)

(73) Assignee: Chengli Li, Suzhou (CN)

( * ) Notice: Subject to any disclaimer, the term of this patent is extended or adjusted under 35 U.S.C. 154(b) by 182 days.

(21) Appl. No.: 16/212,505

(22) Filed: Dec. 6, 2018

(65) Prior Publication Data

US 2019/0115748 A1  Apr. 18, 2019

Related U.S. Application Data

(63) Continuation-in-part of application No. 15/718,661, filed on Sep. 28, 2017, now Pat. No. 10,557,883.

(30) Foreign Application Priority Data

Sep. 22, 2017  (CN) .......................... 2017 1 0864829
Sep. 22, 2017  (CN) ...................... 2017 2 1222432 U
Nov. 22, 2018  (CN) ...................... 2018 2 1930686 U

(51) Int. Cl.
| | | |
|---|---|---|
| H01R 13/713 | (2006.01) | |
| H02H 7/22 | (2006.01) | |
| H02H 1/00 | (2006.01) | |
| H01R 24/30 | (2011.01) | |
| H01R 103/00 | (2006.01) | |
| H02H 3/16 | (2006.01) | |

(52) U.S. Cl.
CPC ........... *H02H 7/228* (2013.01); *H01R 13/713* (2013.01); *H02H 1/0007* (2013.01); *H01R 24/30* (2013.01); *H01R 2103/00* (2013.01); *H02H 1/00* (2013.01); *H02H 3/16* (2013.01); *H02H 7/22* (2013.01)

(58) Field of Classification Search
USPC ........................................................ 361/42
See application file for complete search history.

(56) References Cited

U.S. PATENT DOCUMENTS

| | | |
|---|---|---|
| 4,707,759 A | 11/1987 | Bodkin |
| 5,708,364 A | 1/1998 | Vokey et al. |
| 8,605,402 B2 | 12/2013 | Ward et al. |
| 9,331,582 B2 | 5/2016 | Goerke |

(Continued)

*Primary Examiner* — Danny Nguyen
(74) *Attorney, Agent, or Firm* — Chen Yoshimura LLP

(57) ABSTRACT

A power cord leakage current detection and protection device, including: a switch unit controlling an electrical connection between input and output ends of the device, a switch drive module, and a leakage current detection circuit which includes a leakage current detection line for detecting a leakage current on a power supply line. The switch drive module includes a semiconductor device assembly, and a solenoid assembly coupled between a power supply line and the semiconductor device assembly. The solenoid assembly includes multiple coils with their current paths coupled in parallel; the semiconductor device assembly includes multiple semiconductor devices with their current paths coupled in parallel. When at least one coil is not an open-circuit and at least one semiconductor device is not an open-circuit, the switch drive module controls the switch unit based on a leakage current signal detected by the leakage current detection circuit to disconnect the power supply.

23 Claims, 29 Drawing Sheets

(56) References Cited

U.S. PATENT DOCUMENTS

| | | | |
|---|---|---|---|
| 9,356,402 B2 | 5/2016 | Sung et al. | |
| 9,535,106 B2 | 1/2017 | Li | |
| 9,547,047 B2 | 1/2017 | Li et al. | |
| 9,564,119 B2 | 2/2017 | Ryu et al. | |
| 9,697,926 B2 | 7/2017 | Huang et al. | |
| 2006/0119997 A1* | 6/2006 | Lee | H02H 3/335 361/42 |
| 2007/0159740 A1* | 7/2007 | Williams | H01H 83/02 361/42 |
| 2012/0119918 A1 | 5/2012 | Williams | |
| 2014/0117995 A1 | 5/2014 | Topucharla | |
| 2015/0349517 A1* | 12/2015 | Li | H02H 3/16 361/42 |
| 2017/0222425 A1 | 8/2017 | Li et al. | |

\* cited by examiner

LEAKAGE CURRENT DETECTION AND PROTECTION DEVICE FOR POWER CORD

BACKGROUND OF THE INVENTION

Field of the Invention

This invention relates to electrical apparatus, and in particular, it relates to a leakage current detection and protection device for a power cord.

Description of Related Art

A leakage current detection and protection device for a power cord is a safety device that can prevent fire caused by electrical apparatus. It is implemented in a power cord that has a plug, and functions to detect leakage currents that may occur between the hot line, the neutral line, and the shield layer of the power cord that extend between the plug and the load (e.g. electrical appliances such as air conditioner, dehumidifier, etc.). Upon detecting a leakage current, the device cuts off the power supply, thereby preventing fire and ensuring safety. The device can prevent fire caused by arc fault which can result from damage of the insulation in the hot, neutral, and ground lines of the power cord due to aging, wear, pinch, animal chewing, etc.

A leakage current detection and protection device for a power cord that can detect improper insulation of the power cord is needed.

SUMMARY

Accordingly, the present invention is directed to a device and related method that uses a signal feedback line to detect whether the shield line has an open-circuit, and introduces a open-circuit detection circuit to automatically detect the shield line open-circuit condition.

In one aspect, the present invention provides a power cord leakage current detection and protection device, which includes: a switch unit, configured to control an electrical connection between an input end and an output end of the device; a leakage current protection unit, which includes a switch drive module and a leakage current detection circuit, wherein the leakage current detection circuit includes a leakage current detection line, configured to detect whether a leakage current is present on a first power supply line and/or a second power supply line; and wherein the switch drive module includes a solenoid assembly and a semiconductor assembly, the solenoid assembly being coupled between the first power supply line and the semiconductor assembly, the solenoid assembly including at least two coils with their current paths coupled in parallel, and the semiconductor assembly includes at least two semiconductor devices with their current paths coupled in parallel; wherein when at least one of the coils is not an open-circuit and at least one of the semiconductor devices is not an open-circuit, the switch drive module controls the switch unit to disconnect the electrical connection based on a leakage current signal detected by the leakage current detection circuit.

In one embodiment, the power cord leakage current detection and protection device further includes: an open-circuit detection circuit, which includes a first detection circuit and a second detection circuit, wherein the leakage current detection line is coupled via the first detection circuit to the second power supply line, and wherein the switch drive module is configured to control the switch unit to disconnect the electrical connection in response to the open-circuit detection circuit detecting an open-circuit in the leakage current detection line.

In one embodiment, the solenoid assembly includes a first coil and a second coil with their current paths coupled in parallel, the first and second coils being wound on a same frame or on different respective frames.

In one embodiment, the semiconductor assembly includes a first semiconductor device and a second semiconductor device with their current paths coupled in parallel, and either an anode of the first semiconductor device is coupled to an anode of the second semiconductor device, a control electrode of the first semiconductor device and a control electrode of the second semiconductor device are both coupled to a first end of a first capacitor, and a cathode of the first semiconductor device and a cathode of the second semiconductor device are both coupled to a second end of the first capacitor, and the first capacitor is coupled in parallel with a first drive resistor; or the open-circuit detection circuit further includes a third detection circuit, the leakage current detection line is coupled to the first power supply line via the third detection circuit, an anode of the first semiconductor device is coupled to the first detection circuit, a cathode of the first semiconductor device is coupled to a first end of a first capacitor, a control electrode of the first semiconductor device is coupled to a second end of the first capacitor, the first capacitor is coupled in parallel to a first drive resistor, an anode of the second semiconductor device is coupled to the third detection circuit, a control electrode of the second semiconductor is coupled to a first end of a second capacitor, and a cathode of the second is coupled to a second end of the second capacitor, and the second capacitor is coupled in parallel to a second drive resistor.

In one embodiment, the first detection circuit includes a first resistor and a first diode coupled in series, and the second detection circuit includes a second resistor and a second diode coupled in series.

In one embodiment, the third detection circuit includes a third resistor and a third diode coupled in series.

In one embodiment, the power cord leakage current detection and protection device further includes a signal feedback line, wherein the leakage current detection line is coupled to the first detection circuit via the signal feedback line, wherein when the signal feedback line has an open-circuit, the switch drive module controls the switch unit to disconnect the electrical connection.

In one embodiment, the power cord leakage current detection and protection device further includes a test unit which includes a test switch, wherein the test switch is coupled to the semiconductor assembly either directly or via the signal feedback line, wherein when the test switch is closed, the switch drive module controls the switch unit to disconnect the electrical connection.

In one embodiment, the power cord leakage current detection and protection device further includes a test unit which includes a test switch, wherein the test switch is coupled directly to the semiconductor assembly, wherein when the test switch is closed, the switch drive module controls the switch unit to disconnect the electrical connection.

In one embodiment, the power cord leakage current detection and protection device further includes a housing, configured to accommodate at least one of the switch unit, the leakage current protection unit and the open-circuit detection circuit.

In one embodiment, the semiconductor devices include any of silicon controlled rectifiers, MOS (metal-oxide-semiconductor) transistors, and transistors.

In second aspect, the present invention provides an electrical appliance, including the power cord leakage current detection and protection device described above.

In third aspect, the present invention provides a power cord, which includes a first power supply line; a second power supply line; a ground line; a leakage current detection line (shield line); at least one signal feedback lines; and an insulating cover, wherein each of the at least one signal feedback lines is a conductor line covered by an insulating layer, where the leakage current detection line covers at least the first and second power supply lines, and the insulating cover covers the leakage current detection line and the at least one signal feedback lines.

Embodiments of the present invention not only achieve manual testing of the shield line, they can also automatically detect the shield line open-circuit condition during normal use of the device, thereby improving safety. Further, by using the solenoid assembly and the silicon controlled rectifier assembly, when one of the coils is damaged or one of the semiconductor devices is damaged, the device can still automatically detect open-circuit of the leakage current detection line, thereby improving the reliability of the self-testing function and enhancing safety. Embodiments of the invention have the additional advantage of a simple structure and low cost.

BRIEF DESCRIPTION OF THE DRAWINGS

The following drawings are used to describe the embodiments. These drawings explain the principles of the invention, and only illustrate the structures that are necessary for understanding the invention. The drawings are not necessarily to scale. In the multiple drawings, the same or similar reference symbols denote the same or similar structures.

DETAILED DESCRIPTION OF PREFERRED EMBODIMENTS

Embodiments of the invention are described below with reference to the drawings. The drawings illustrate specific embodiment that can achieve the goals of the present invention. The illustrated embodiments are not intended to show all possible embodiments of the invention. It should be understood that other embodiments can be constructed without departing from the spirit of the invention, and the illustrated embodiments may be modified structurally or logically. Thus, the detailed descriptions below are limiting, and the scope of the invention should be determined by the appended claims. Phrases such as "including" should be understood to be open-ended which means "including without limitation," indicating that other examples may be included as well. Phrases such as "an embodiment" means "at least one embodiment," and "another embodiment" means "at least another embodiment," etc.

Figure 1:
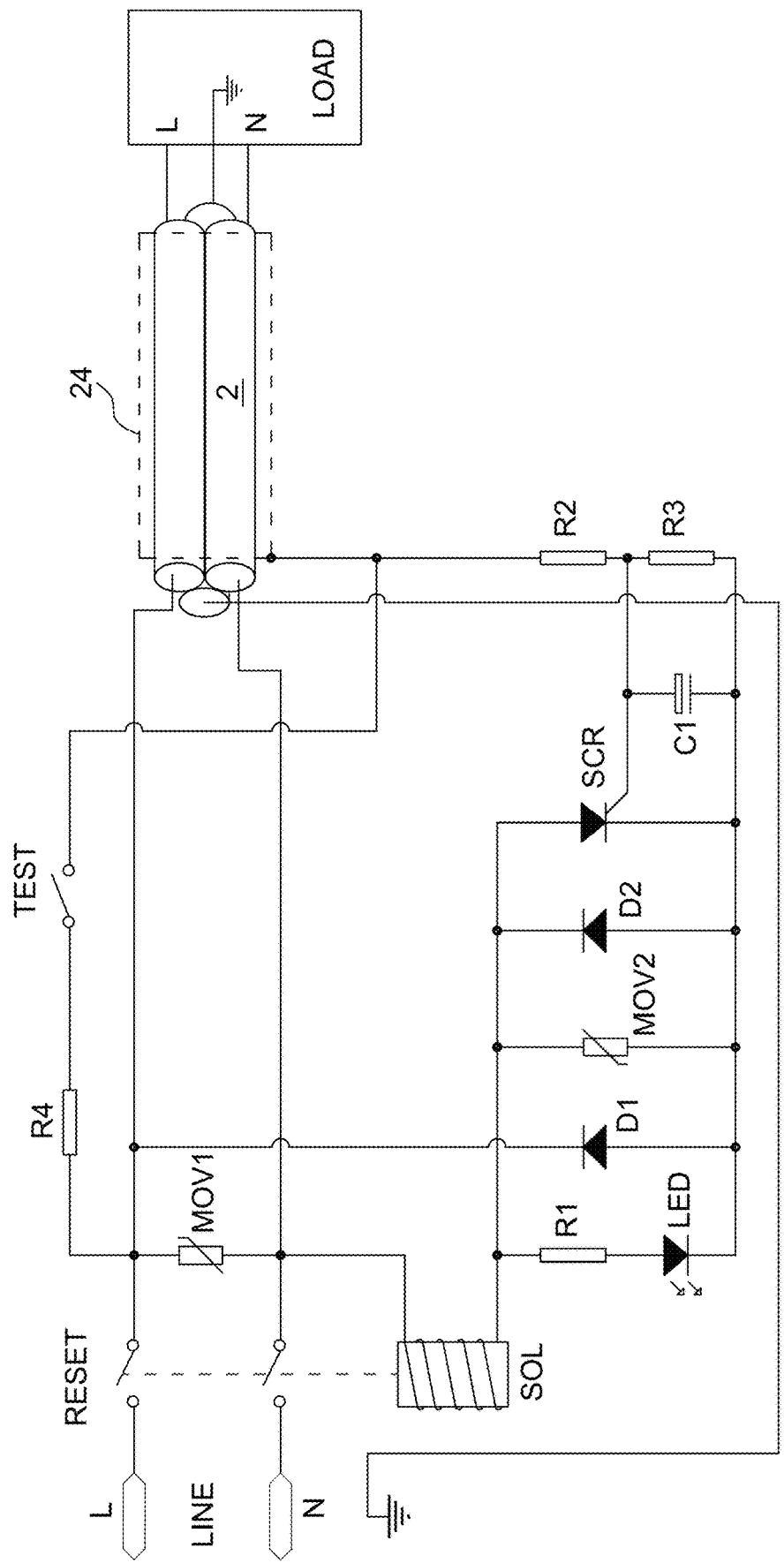
FIG. 1 illustrates a conventional LCDI (leakage current detection and interruption) device.

FIG. 1 illustrates a conventional LCDI (leakage current detection and interruption) device. Through experiments and analyses, the inventors discovered various shortcomings of the conventional LCDI device:

First, as a protection device, technical standards require the device to have a reset switch RESET and a test switch TEST. The reset switch RESET is used to make or break power connection, and the test switch TEST is used to test whether the protection function of the device is operating normally. From time to time during use, the user needs to operate the test switch TEST and the reset switch RESET, to determine whether the device is functioning normally. However, to test the functions of the LCDI device, the user needs to press the TEST button to simulate a leakage current fault. In practical use, for various reasons, few users will regularly press the TEST button to test the device. This presents a hidden threat to safety.

Further, in conventional LCDI devices with self-testing functions, when the solenoid is rendered non-conductive due to faults in certain electrical components, the device will indicate its lost of proper function via visible indications such as indicator light, button position, etc., to alert the user to stop using the device. However, if a user cannot perceive such fault indications due to disability, and therefore continues to use a faulty LCDI device that has lost its protection function, safety is compromised and personal and property damage may occur.

Embodiments of the present invention provide a power cord leakage current detection and protection device. The device uses a signal feedback line to detect and monitor whether the leakage current detection line (the shield line) of the power cord has an open-circuit. Thus, by operating the test switch TEST, the user can determine whether the leakage current detection line has an open-circuit (i.e. disconnected). Further, the device includes an open-circuit detection circuit, for detecting and monitoring whether the leakage current detection line of the power cord has an open-circuit; when it has an open-circuit, the device automatically cuts off the power supply, to ensure safety of the electrical appliance.

Figure 2:
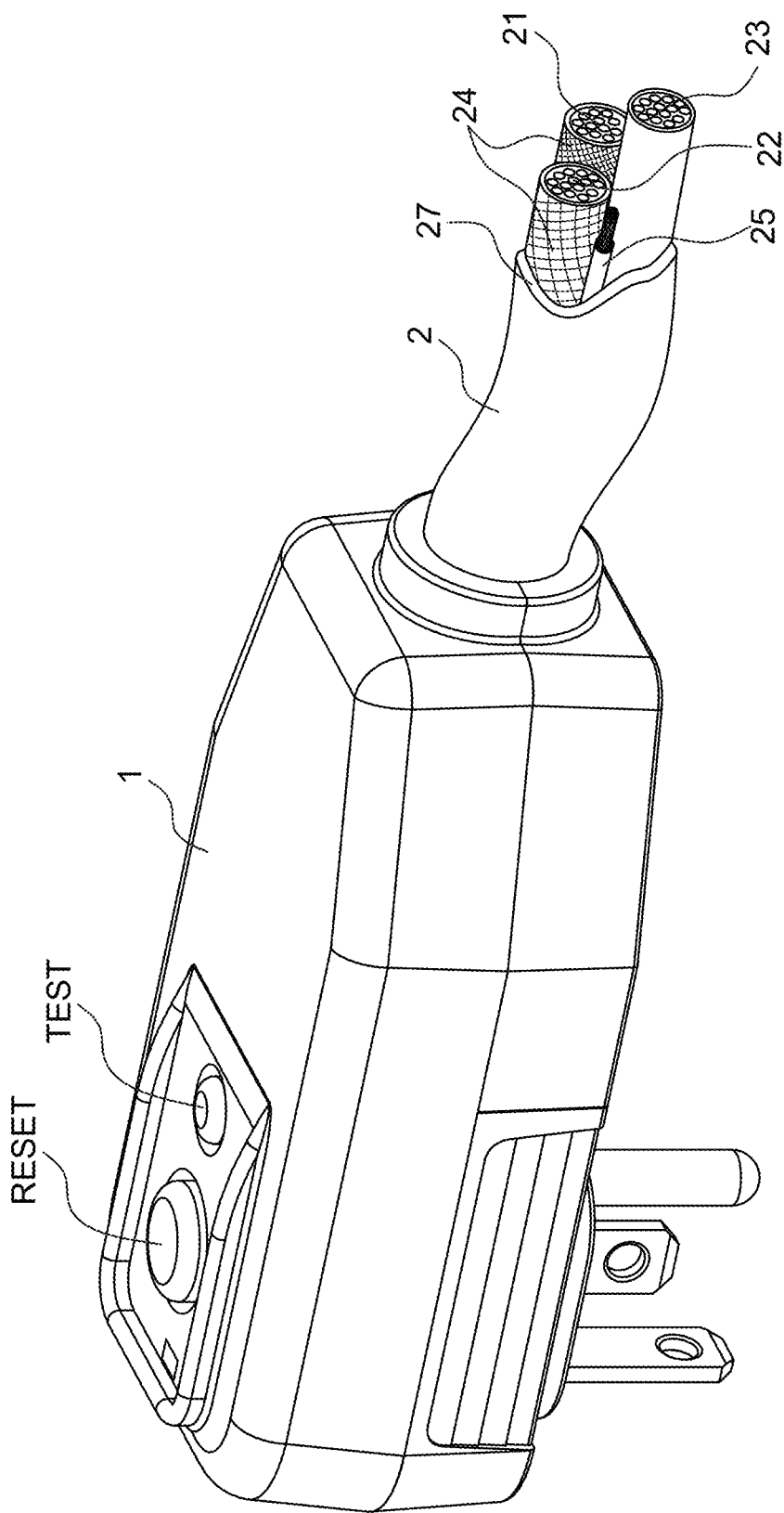
FIG. 2 is an exterior view of a power plug according to embodiments of the present invention.
Figure 3B:
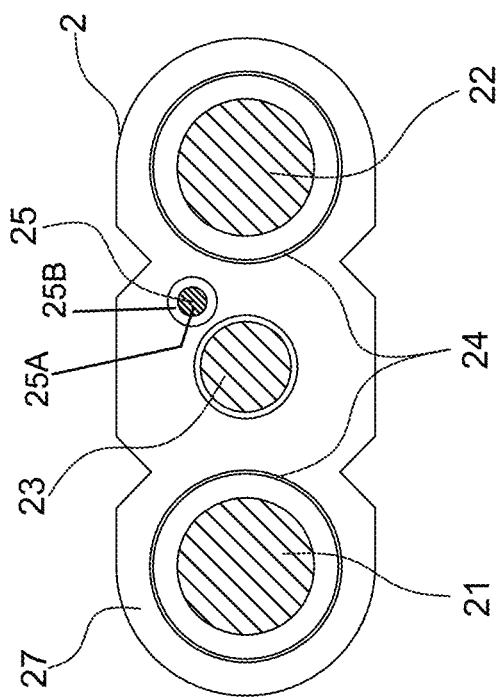
FIG. 3B illustrates the structure of a power cord according to another embodiment of the present invention.
Figure 3A:
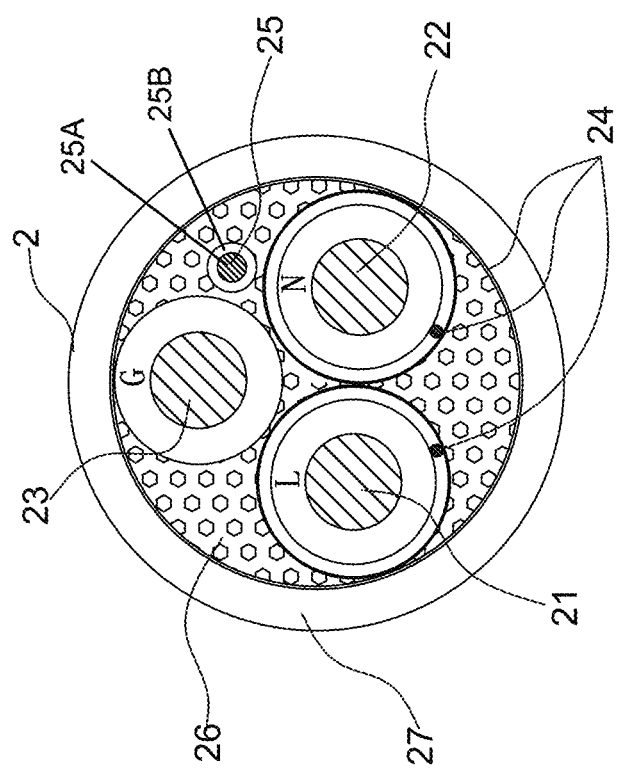
FIG. 3A illustrates the structure of a power cord according to an embodiment of the present invention.
Figure 3D:
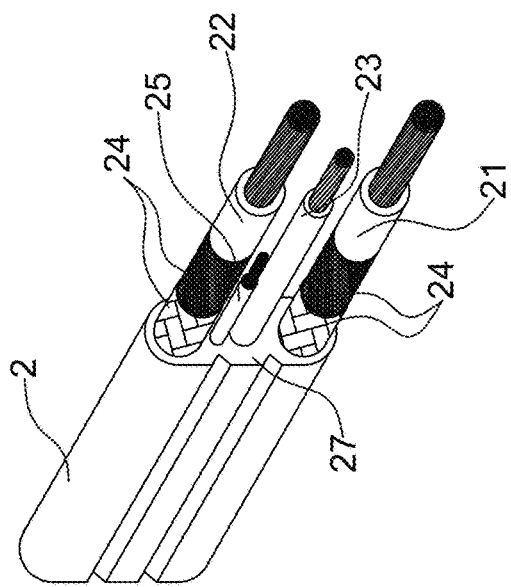
FIG. 3D is a cross-sectional view of the power cord of FIG. 3B.
Figure 3C:
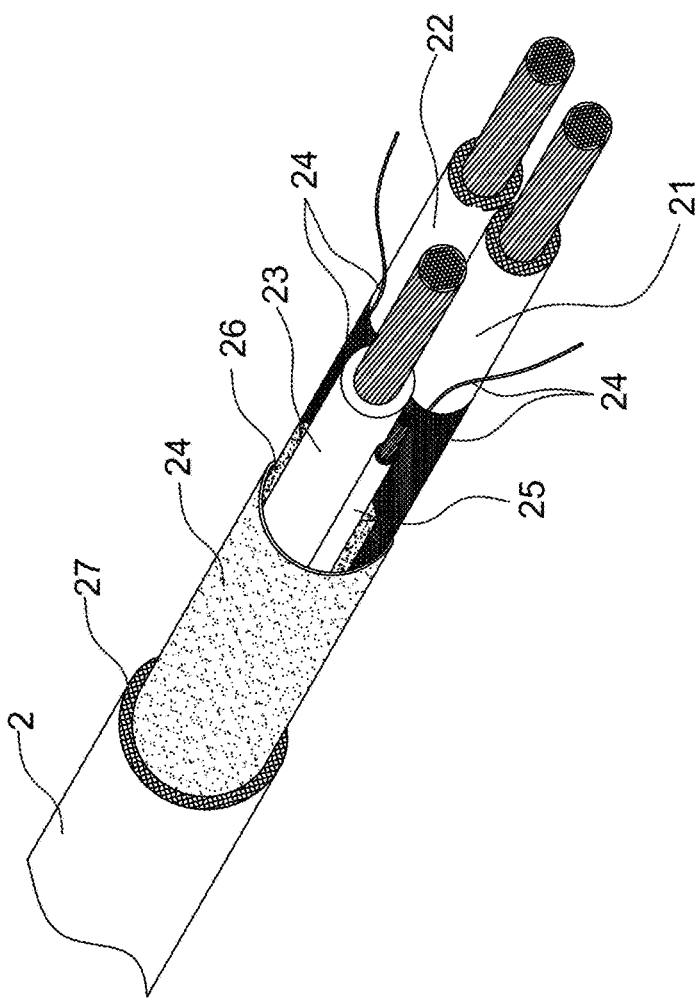
FIG. 3C is a cross-sectional view of the power cord of FIG. 3A.

As shown in FIG. 2, the power cord leakage current detection and protection device has a plug 1 that includes a switch unit, and an external power cord 2. The plug 1 includes a test switch TEST and a reset switch RESET. In the embodiment shown in FIG. 2, the power cord 2 includes a hot line (L) 21, a neutral line (N) 22, a ground line (G) 23, a leakage current detection line (shield line) 24, a signal feedback line 25, and an insulating cover 27. The signal feedback line 25 is a conductor 25A having its own insulating layer 25B (see FIGS. 3A and 3B). The leakage current detection line 24 covers at least the L line and N line, and the signal feedback line 25 and the leakage current detection line 24 are covered by the insulating cover 27. The signal feedback line 25 can be disposed at any suitable position within the cover 27. The exterior cross-section of the power cord 2 may be round, where the leakage current detection line 24 covers the L line and N line and is coupled to the signal feedback line 25 via a current conductor line (see FIGS. 3A and 3C). Alternatively, the exterior cross-section of the power cord 2 may be oblong with a side-by-side configuration, with two leakage current detection lines 24 respectively covering the L line and N line (see FIGS. 3C and 3D). The exterior cross-section of the power cord 2 may have other suitable shapes. It should be understood that in other embodiment, the power cord 2 may include other signal lines. Further, the power cord 2 may include multiple signal feedback lines 25 and multiple leakage current detection lines 24.

Figure 4:
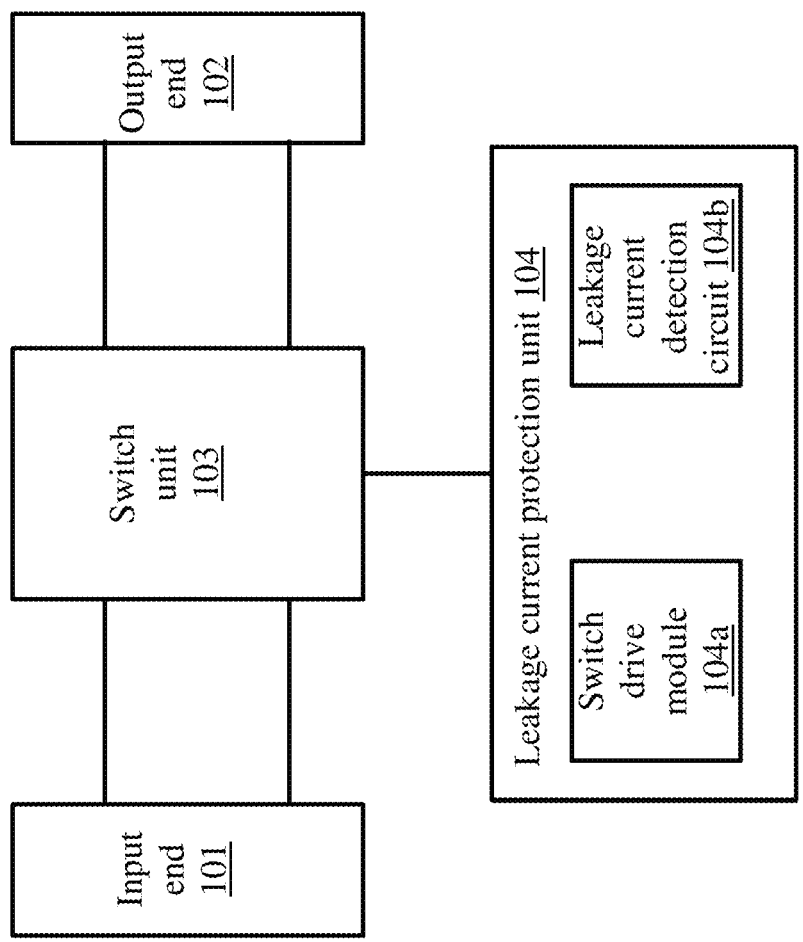
FIG. 4 is a block diagram showing a leakage current detection and protection device for a power cord according to an embodiment of the present invention.
Figure 5A:
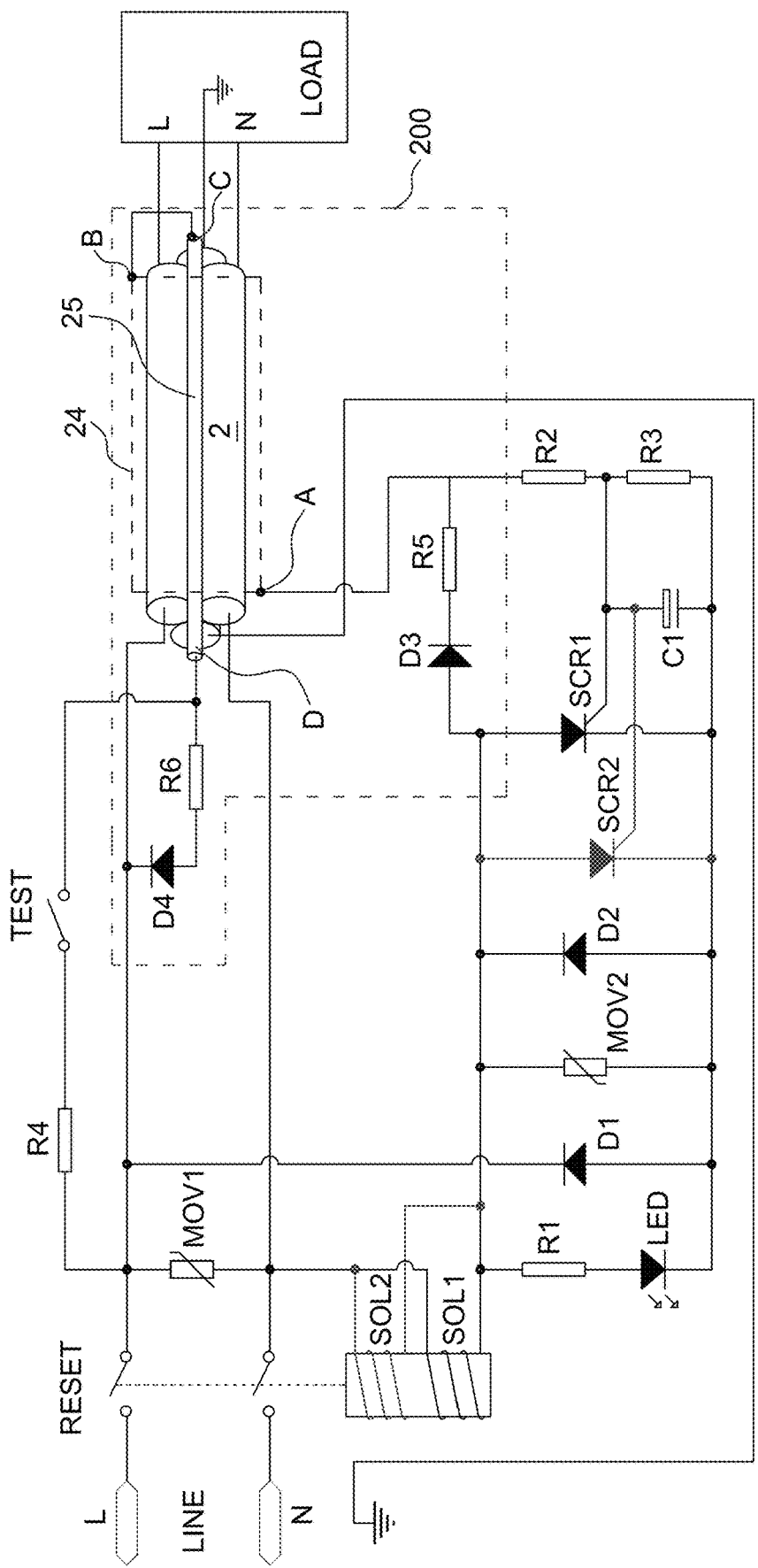
FIG. 5A-5D are circuit diagrams of leakage current detection and protection devices according to first to fourth embodiments of the present invention.

FIG. 4 is a block diagram showing a power cord leakage current detection and protection device according to an embodiment of the present invention. The power cord leakage current detection and protection device 10 includes: a switch unit 103 (e.g., a mechanical switch), configured to control the electrical connection and disconnection between the input end 101 and the output end 102; a leakage current protection unit 104, which includes a switch drive module 104a and a leakage current detection circuit 104b. The switch drive module 104a is configured to control the switch unit 103 based on the leakage current signal detected by the leakage current detection circuit 104b, to disconnect the power connection. More specifically, the leakage current detection circuit 104b includes the leakage current detection line, configured to detect whether a leakage current is present on the L line and/or N line; and a signal feedback line, configured to detect whether the leakage current detection circuit has an open-circuit. The power cord leakage current detection and protection device further includes a test switch TEST coupled to the signal feedback line. When the test switch TEST is closed (connected), the switch drive module 104a controls the switch unit 103 based on the signal on the signal feedback line. FIG. 5A is a circuit diagram of a leakage current detection and protection device according to a first embodiment of the present invention. As shown in FIG. 5A, the leakage current detection and protection device additionally includes an open-circuit detection circuit 200, which includes a first detection circuit (D4, R6) and a second detection circuit (D3, R5). The leakage current detection line 24 of the power cord 2 is coupled at one end A to a control circuit R2, and coupled at the other end B to one end C of the signal feedback line 25. The other end D of the signal feedback line 25 is coupled to the test switch TEST. Thus, the test switch TEST is coupled to the leakage current detection line 24 via the signal feedback line 25. The test switch TEST is for example a mechanical switch, and along with its associated electrical components, forms the test unit. Further, the end D of the signal feedback line 25 is coupled to the L line via the first detection circuit, and the N line is coupled to the end A of the leakage current detection line 24 via a solenoid assembly, a silicon controlled rectifier assembly and the first detection circuit. The solenoid assembly and the silicon controlled rectifier assembly form a switch drive circuit. The solenoid assembly includes, as shown in FIG. 5A, two coils SOL1 and SOL2 that are coupled in parallel and wound on the same coil frame. One end of the parallel-coupled coils SOL1 and SOL2 is coupled to the N line, another end of the parallel-coupled coils is coupled to the silicon controlled rectifier assembly. The silicon controlled rectifier assembly includes two silicon controlled rectifier SCR1 and SCR2 coupled in parallel. The anode of the silicon controlled rectifier SCR1 and the anode of the silicon controlled rectifier SCR2 are coupled together and coupled between the solenoid assembly and diode D3. The control electrode of the silicon controlled rectifier SCR1 and the control electrode of the silicon controlled rectifier SCR2 are both coupled to one end of capacitor C1, and the cathode of the silicon controlled rectifier SCR1 and the cathode of the silicon controlled rectifier SCR2 are both coupled to the other end of capacitor C1. Capacitor C1 is coupled in parallel with resistor R3. This way, when one of the coils or one of the silicon controlled rectifiers is defective and becomes an open-circuit, the solenoid assembly and the silicon controlled rectifier assembly can still function normally.

When the test switch TEST is depressed, a simulated leakage current flows from the hot line L through a resistor R4, the test switch TEST, the signal feedback line 25, the leakage current detection line 24, resistors R2 and R3, a diode D2, the solenoid assembly to the neutral line N, forming a test current loop. The simulated leakage current causes the voltage across the resistor R3 to rise, which drives the silicon controlled rectifier assembly to become conductive. When the silicon controlled rectifier assembly is conductive, a trip current loop is formed from the neutral line N, the solenoid assembly, the silicon controlled rectifier assembly, and the diode D1 to the hot line L. Thus, a relatively large current flows through the solenoid assembly, so it generates a sufficiently large magnetic field, causing the reset switch RESET to trip which cuts off the power. Note that he reset switch RESET corresponds to the switch unit 103 in FIG. 4. If any component or lines in the test current loop is open, the device will not trip when the test switch TEST is depressed. Thus, the user can operate the test switch TEST to detect whether the leakage current detection line 24 is intact. It can also be seen that depending on the applications, the same structure and operation can be used to detect abnormal conditions of any of the components of the test current loop.

The TEST switch is normally open; when the leakage current detection line 24 is operating normally (not an open-circuit), by setting the resistors R5 and R6, the point A is limited to a relatively low voltage, so the silicon controlled rectifier assembly is not triggered to conduct, and the device operates normally. But when any location along the leakage current detection line 24 has an open-circuit, a current loop is formed from the neutral line N, via the solenoid assembly, the diode D3, the resistor R5, the resistor R2, the resistor R3, the diode D1, to the hot line L. The voltage across the resistor R3 will rise, which triggers the silicon controlled rectifier assembly to become conductive. When the silicon controlled rectifier assembly, the solenoid assembly, and the diode D1 form a current loop, the solenoid assembly generates a magnetic field to cause the reset switch RESET to trip, which cuts off the power.

Similarly, when the signal feedback line 25 has an open-circuit, the power can be cut off in similar manner.

Figure 5B:
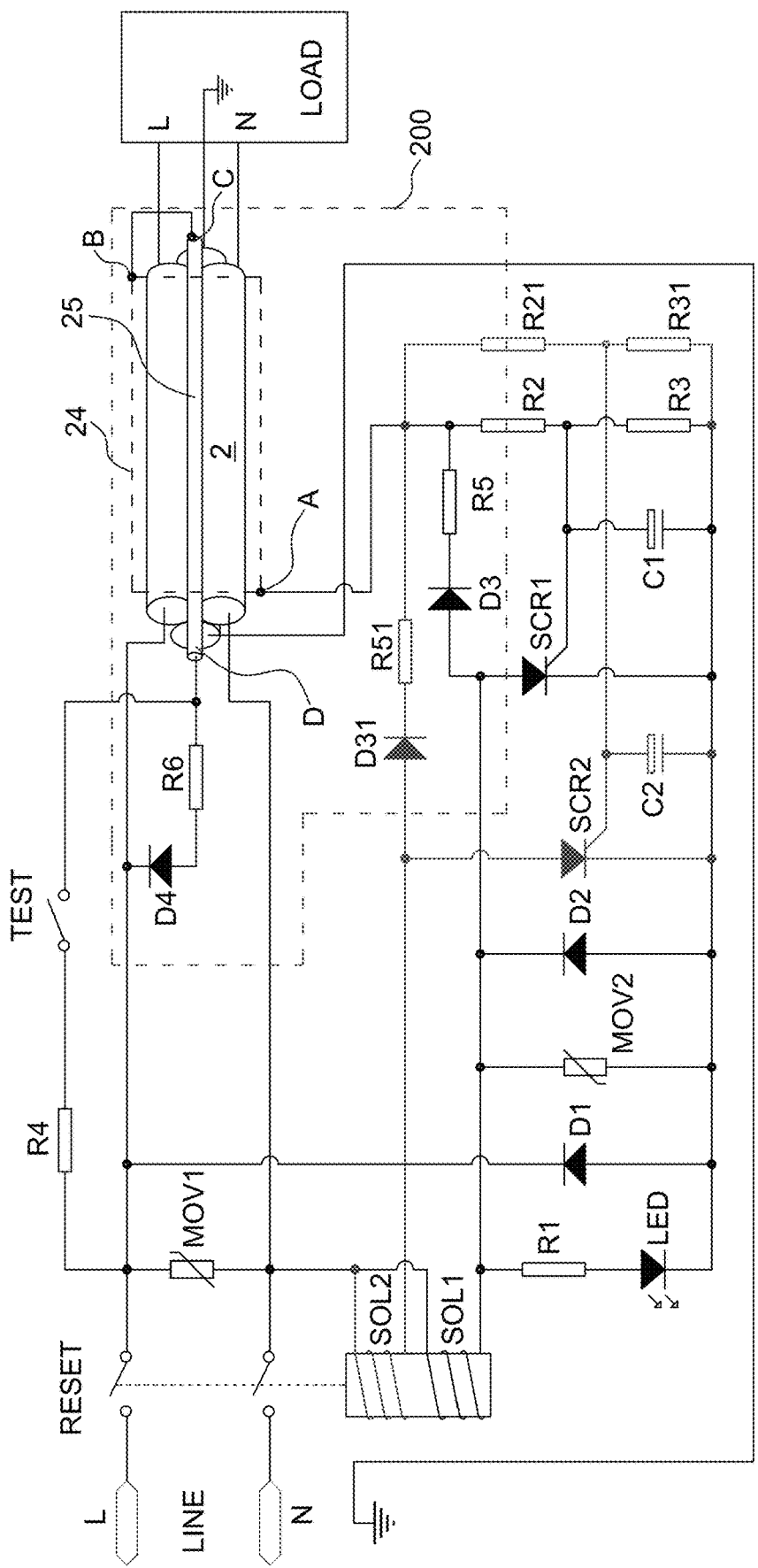

In the second embodiment shown in FIG. 5B, compared to the first embodiment shown in FIG. 5A, the circuit further includes resistors R21 and R31 coupled in series, and the open-circuit detection circuit 200 further includes a third detection circuit (D31, R51). The leakage current detection line 24 is coupled to the N line via the third detection circuit. The anode of the silicon controlled rectifier SCR1 is coupled to diode D3, the control electrode of the silicon controlled rectifier SCR1 is coupled to one end of capacitor C1, and the cathode of the silicon controlled rectifier SCR1 is coupled to the other end of capacitor C1. Capacitor C1 is coupled in parallel to resistor R3. The anode of the silicon controlled rectifier SCR2 is coupled to diode D31, the control electrode of the silicon controlled rectifier SCR2 is coupled to one end of capacitor C2, and the cathode of the silicon controlled rectifier SCR2 is coupled to the other end of capacitor C2. Capacitor C2 is coupled in parallel to resistor R31. In this embodiment, when the TEST switch is pressed, a simulated current flows in a current loop formed from the L line via resistor R4, test switch TEST, signal feedback line 25, leakage current detection line 24, resistors R2 and R3, diode D2, solenoid SOL1 to the N line. The simulated current causes the voltage across the resistor R3 to rise, which triggers the silicon controlled rectifier SCR1 to become conductive. When the silicon controlled rectifier SCR1 is conductive, a trip current loop is formed from the N line, solenoid SOL1, silicon controlled rectifier SCR1, diode D1 to L line, so the solenoid assembly has a high current and generates a high magnetic field to cause the reset switch RESET to trip, which cuts off the power. And/or, when the TEST switch is pressed, a simulated current flows in a current loop formed from the L line via resistor R4, test switch TEST, signal feedback line 25, leakage current detection line 24, resistors R21 and R31, diode D2, solenoid SOL1 to the N line. The simulated current causes the voltage across the resistor R31 to rise, which triggers the silicon controlled rectifier SCR2 to become conductive. When the silicon controlled rectifier SCR2 is conductive, a trip current loop is formed from the N line, solenoid SOL2, silicon controlled rectifier SCR2, diode D1 to L line, so the solenoid assembly has a high current and generates a high magnetic field to cause the reset switch RESET to trip, which cuts off the power.

Similar to the first embodiment, the TEST switch is normally open; when any location along the leakage current detection line 24 has an open-circuit, a current loop is formed from the neutral line N, via the solenoid SOL1, the diode D3, the resistor R5, the resistor R2, the resistor R3, the diode D1, to the hot line L. The voltage across the resistor R3 will rise, which triggers the silicon controlled rectifier SCR1 to become conductive. And/or, a current loop is formed from the neutral line N, via the solenoid SOL2, the diode D31, the resistor R51, the resistor R21, the resistor R31, the diode D1, to the hot line L. The voltage across the resistor R31 will rise, which triggers the silicon controlled rectifier SCR2 to become conductive. When the coil SOL1, silicon controlled rectifier SCR1, and diode D1 form a current loop, and/or the coil SOL2, silicon controlled rectifier SCR2, and diode D1 form a current loop, the solenoid assembly generates a magnetic field to cause the reset switch RESET to trip, cutting off the power. Similarly, when the signal feedback line 25 has an open-circuit, the power can be cut off in similar manner.

Figure 5C:
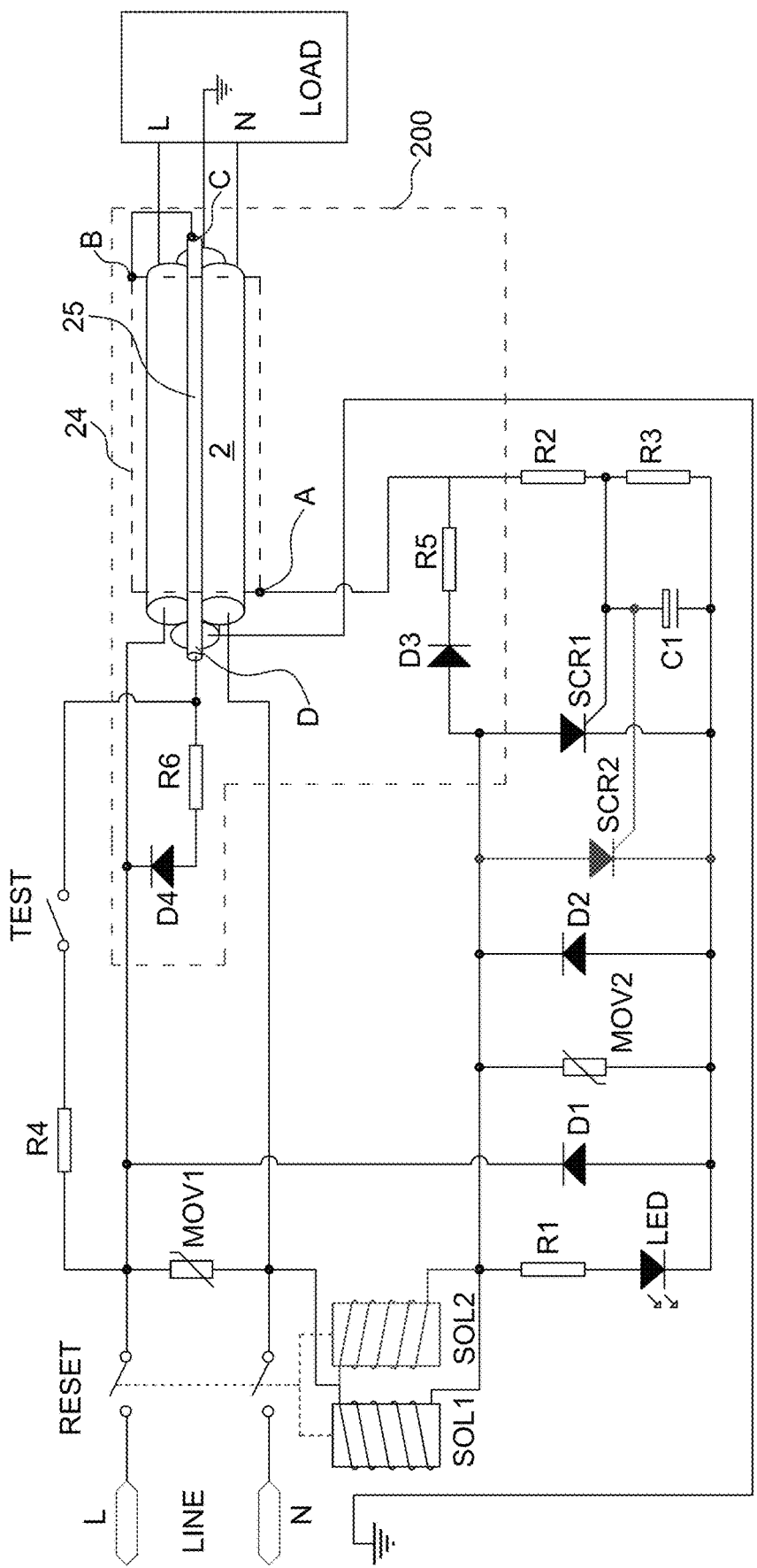
Figure 5D:
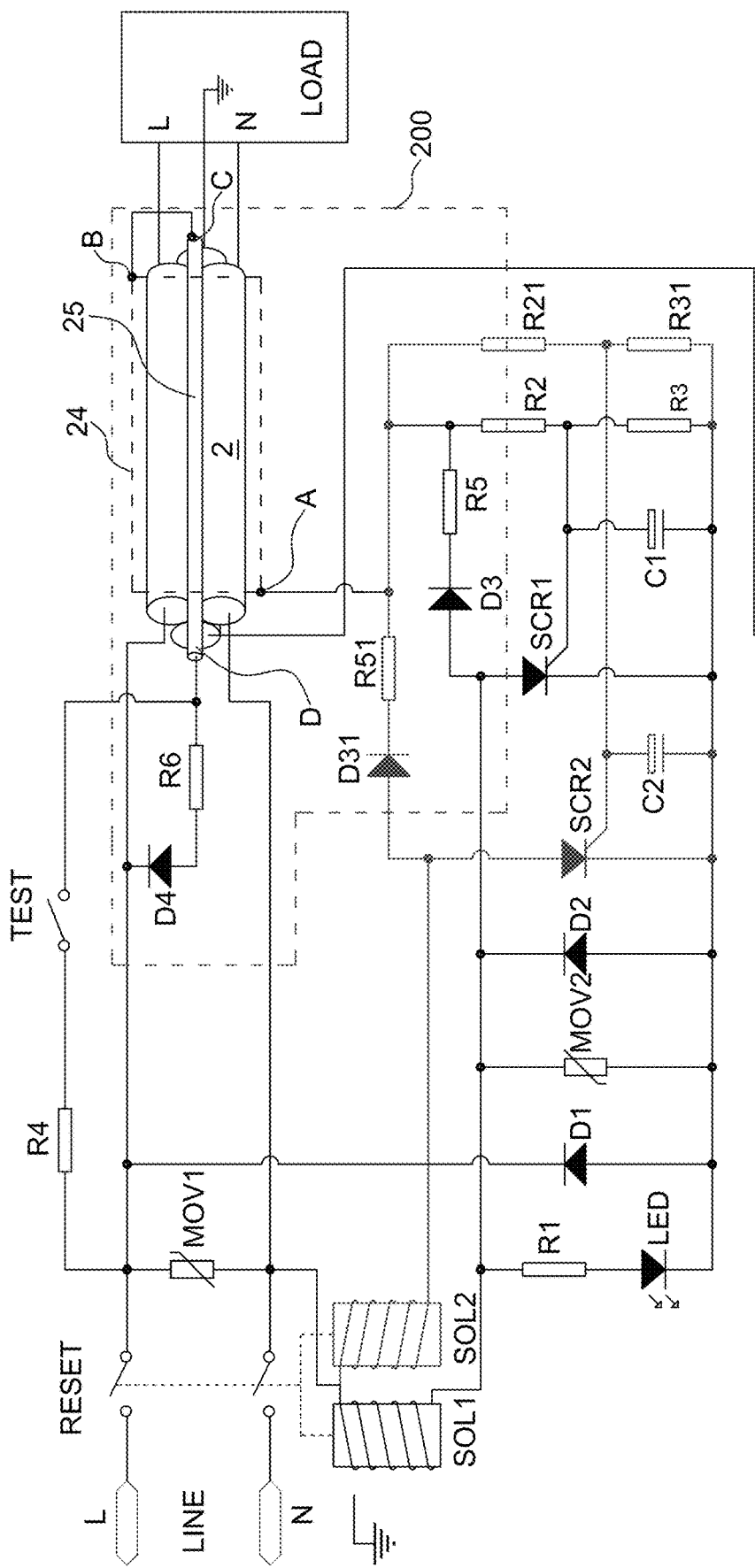

It should be understood that, the solenoid assembly may be formed by multiple coils wound around the same frame and with their current paths coupled in parallel to each other, or multiple coils wound around separate frames respectively and with their current paths connected in parallel to each other (for example, FIG. 5C shows a third embodiment and FIG. 5D shows a fourth embodiment, where the embodiment of FIG. 5C is the same as that of the first embodiment except for the way the coils are wound, and the embodiment of FIG. 5D is the same as that of the second embodiment except for the way the coils are wound; these embodiments are not described in more detail here). The silicon controlled rectifier assembly may be formed by multiple silicon controlled rectifiers with their current paths coupled in parallel. In this disclosure, when the two (or more) coils are said to have their current paths coupled in parallel, it refers to a coupling where one end of the coils are coupled to the same point and the current flow between that point and the coils are the same. The same applies to the two (or more) silicon controlled rectifiers. For example, in the circuits of FIGS. 5A and 5C, the two coils SOL1 and SOL2 are coupled in parallel, while in the circuits of FIGS. 5B and 5D, although the two coils SOL1 and SOL2 are not strictly coupled in parallel (their lower ends are not coupled to the same point), their current paths are coupled in parallel, since their upper ends are coupled to the same point. Similarly, in FIGS. 5A and 5C, the two silicon controlled rectifiers SCR1 and SCR2 are coupled in parallel, while in FIGS. 5B and 5D, although SCR1 and SCR2 are not strictly coupled in parallel (their anodes are not coupled to the same point), their current paths are coupled in parallel, since their cathodes are coupled to the same point.

Thus, the above described power cord leakage current detection and protection devices can automatically detect an open-circuit condition of the leakage current detection line 24, the signal feedback line 25, etc. Meanwhile, by using the solenoid assembly that employs two or more coils wound on the same or different respective frames, even when one of the coils is damaged and becomes an open-circuit, the other coil can still function. At the same time, by using the silicon controlled rectifier assembly that employs two or more parallel coupled silicon controlled rectifiers, even when one of the silicon controlled rectifiers is damaged, the other one can still function. These enhance the reliability of the self test function.

Figure 6A:
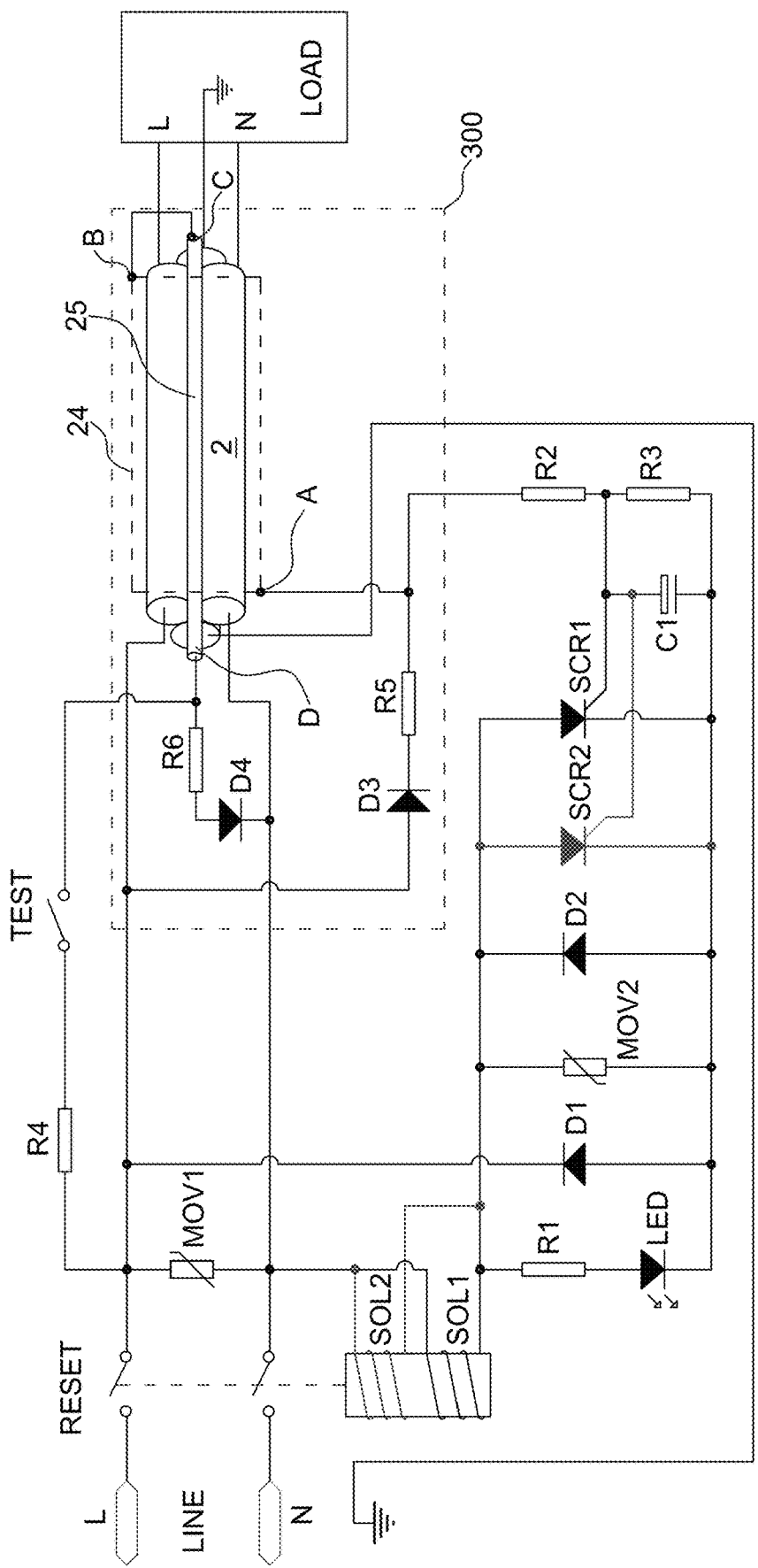
FIG. 6A-6D are circuit diagrams of leakage current detection and protection devices according to fifth to eighth embodiments of the present invention.
Figure 6B:
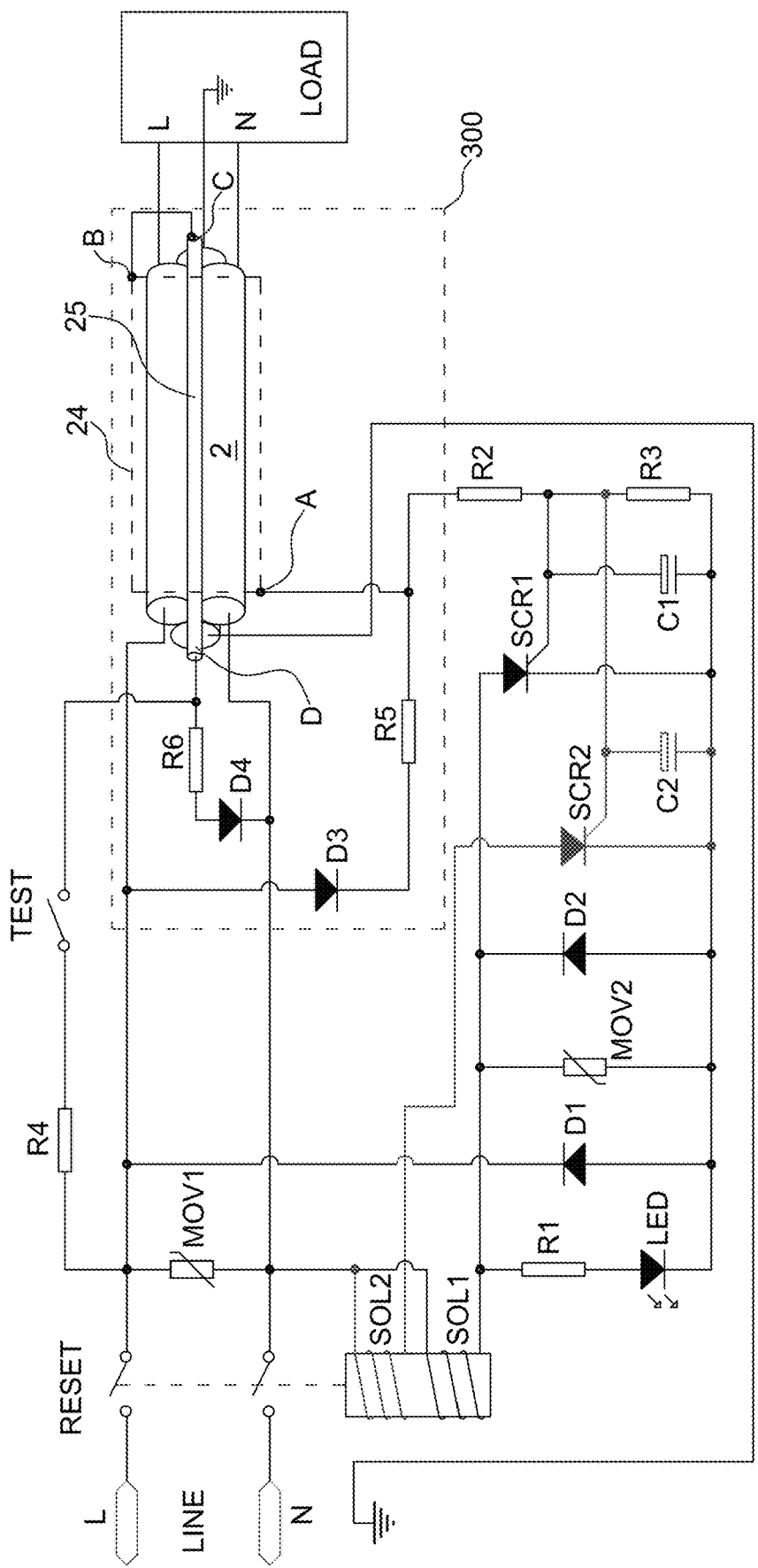
Figure 6C:
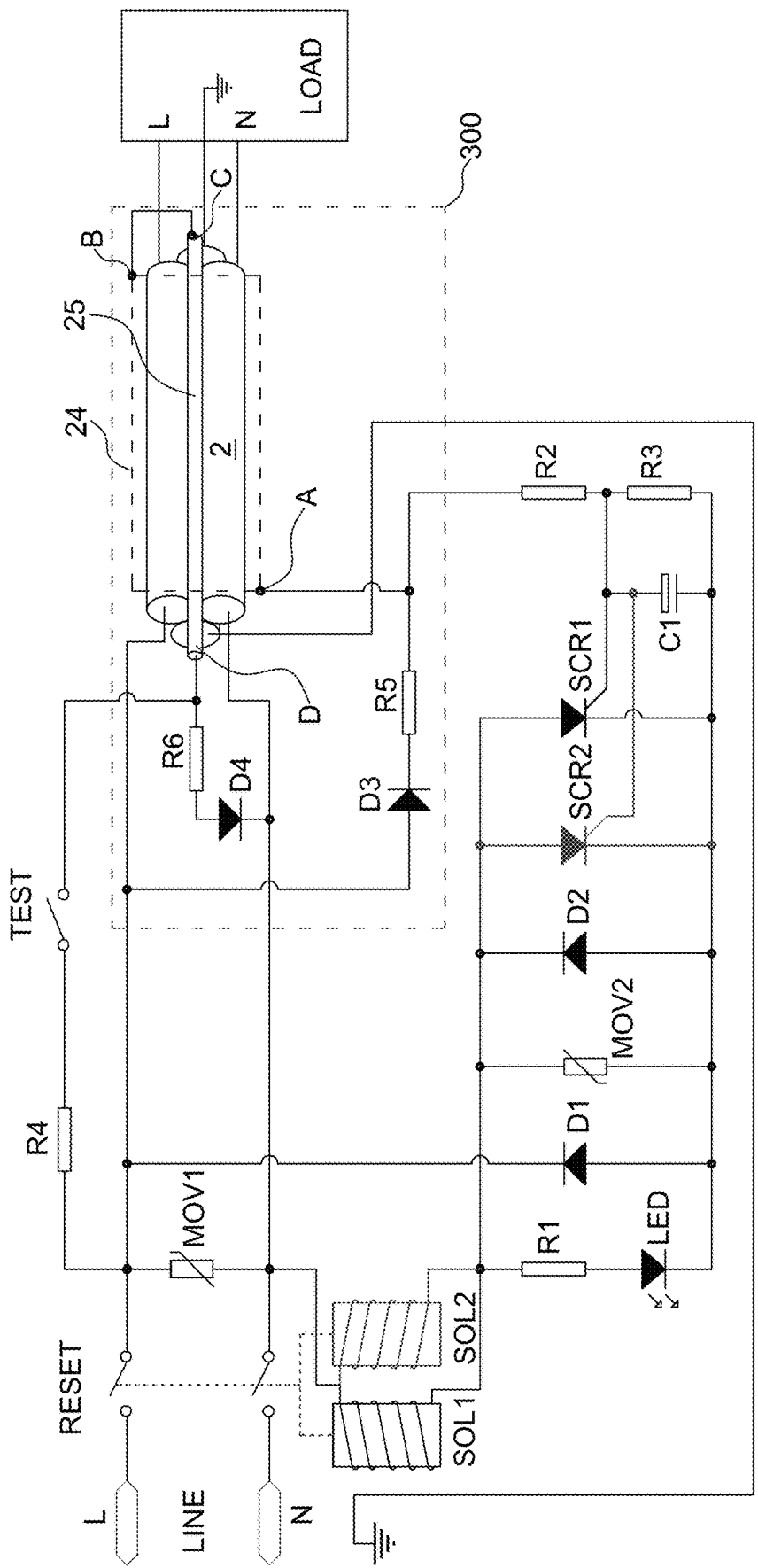
Figure 6D:
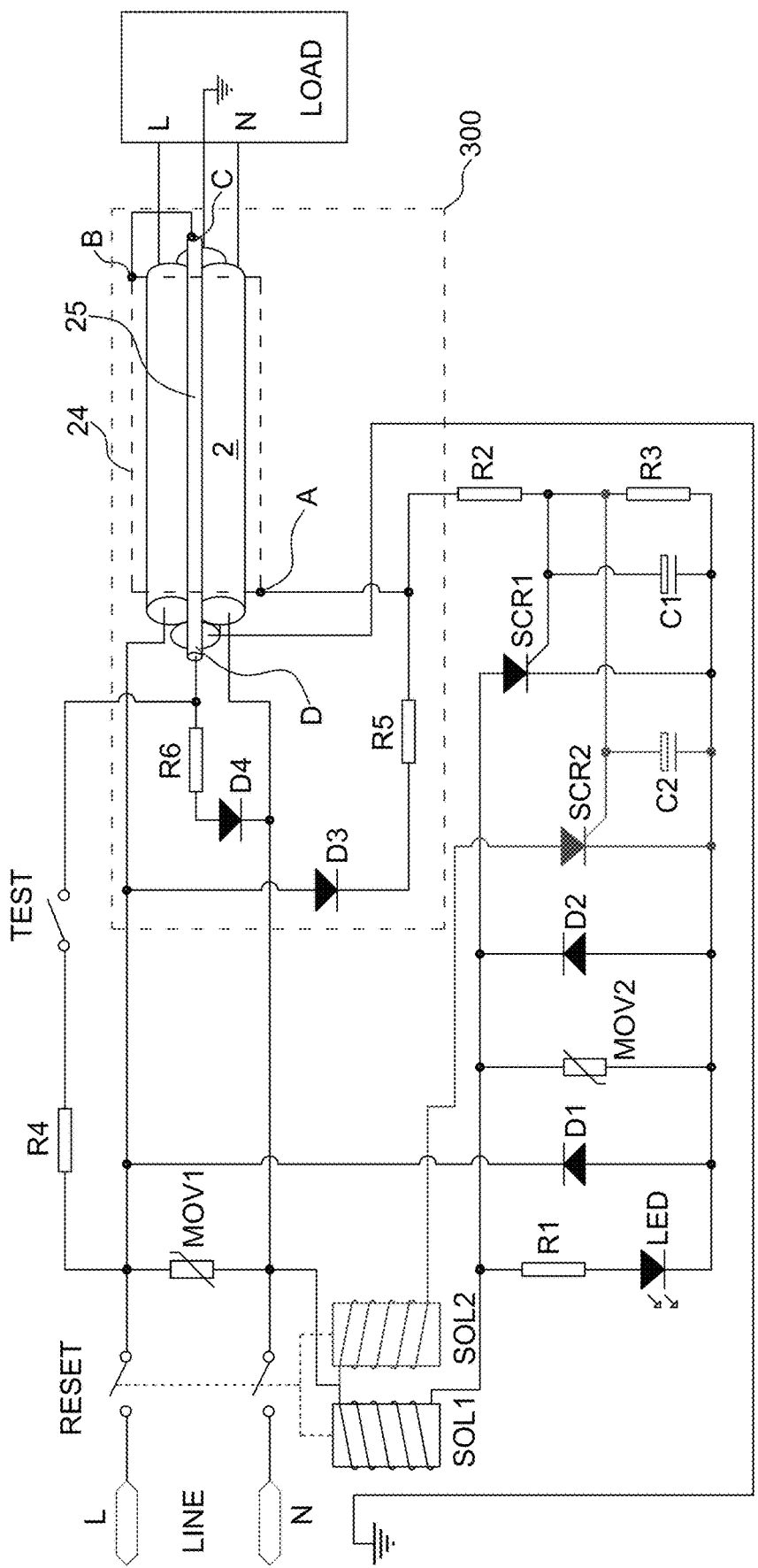

FIG. 6A is a circuit diagram of a leakage current detection and protection device according to a fifth embodiment of the present invention. Similar to the device of FIG. 5A, the power cord leakage current detection and protection device of FIG. 6A includes an open-circuit detection circuit 300. One difference is that, here, the feedback line is coupled to the N line via the first detection circuit (D4, R6), and the L line is coupled directly to the resistor R2 of the control circuit via second detection circuit (D3, R5). The anodes of the silicon controlled rectifiers SCR1 and SCR2 are not directly coupled to diode D3. When the leakage current detection line 24 is operating normally, by voltage division of the resistors R5 and R6, the point A is limited to a relatively low voltage, so the silicon controlled rectifier assembly is not triggered to conduct, and the device operates normally. But when any location along the leakage current detection line 24 has an open-circuit, a current loop is formed from the L line, via the diode D3, the resistor R5, the resistor R2, the resistor R3, the diode D2, and the solenoid assembly to the N line. The voltage across the resistor R3 will rise, which triggers the silicon controlled rectifier assembly to become conductive. Thus, the solenoid assembly generates a magnetic field to cause the reset switch RESET to trip, which cuts off the power. Thus, the power cord leakage current detection and protection device of FIG. 6A can automatically detect an open-circuit condition of the leakage current detection line 24. The sixth embodiment shown in FIG. 6B is similar to the embodiment of FIG. 6A, one difference being, the anode of silicon controlled rectifier SCR2 is coupled to coil SOL2, but is not coupled to coil SOL1 and the anode of the silicon controlled rectifier SCR1; the control electrode of the silicon controlled rectifier SCR2 is coupled to one end of capacitor C2, the cathode of the silicon controlled rectifier SCR2 is coupled to the other end of capacitor C2; and capacitor C2 is coupled in parallel to resistor R3. When any location along the leakage current detection line 24 has an open-circuit, a current loop is formed from the L line, via the diode D3, the resistor R5, the resistor R2, the resistor R3, the diode D2, and the solenoid SOL1 to the N line. The voltage across the resistor R3 will rise, which triggers the silicon controlled rectifier SCR 1 and/or SCR2 to become conductive. When silicon controlled rectifier SCR1 is conductive, a current loop is formed from the N line, via solenoid SOL1, silicon controlled rectifier SCR1, diode D1 to the L line, causing the solenoid assembly to generate a magnetic field which trips the reset switch RESET, cutting off power. And/or, when silicon controlled rectifier SCR2 is conductive, a current loop is formed from the N line, via solenoid SOL2, silicon controlled rectifier SCR2, diode D1 to the L line, causing the solenoid assembly to generate a magnetic field which trips the reset switch RESET, cutting off power. Thus, the power cord leakage current detection and protection device of FIG. 6A can automatically detect an open-circuit condition of the leakage current detection line 24. The power cord leakage current detection and protection device of the seventh embodiment shown in FIG. 6C is similar to the embodiment of FIG. 6A, except that the two coils of the solenoid assembly are respectively wound around two separate frames. The power cord leakage current detection and protection device of the eighth embodiment shown in FIG. 6D is similar to the embodiment of FIG. 6B, except that the two coils of the solenoid assembly are respectively wound around two separate frames.

Figure 7A:
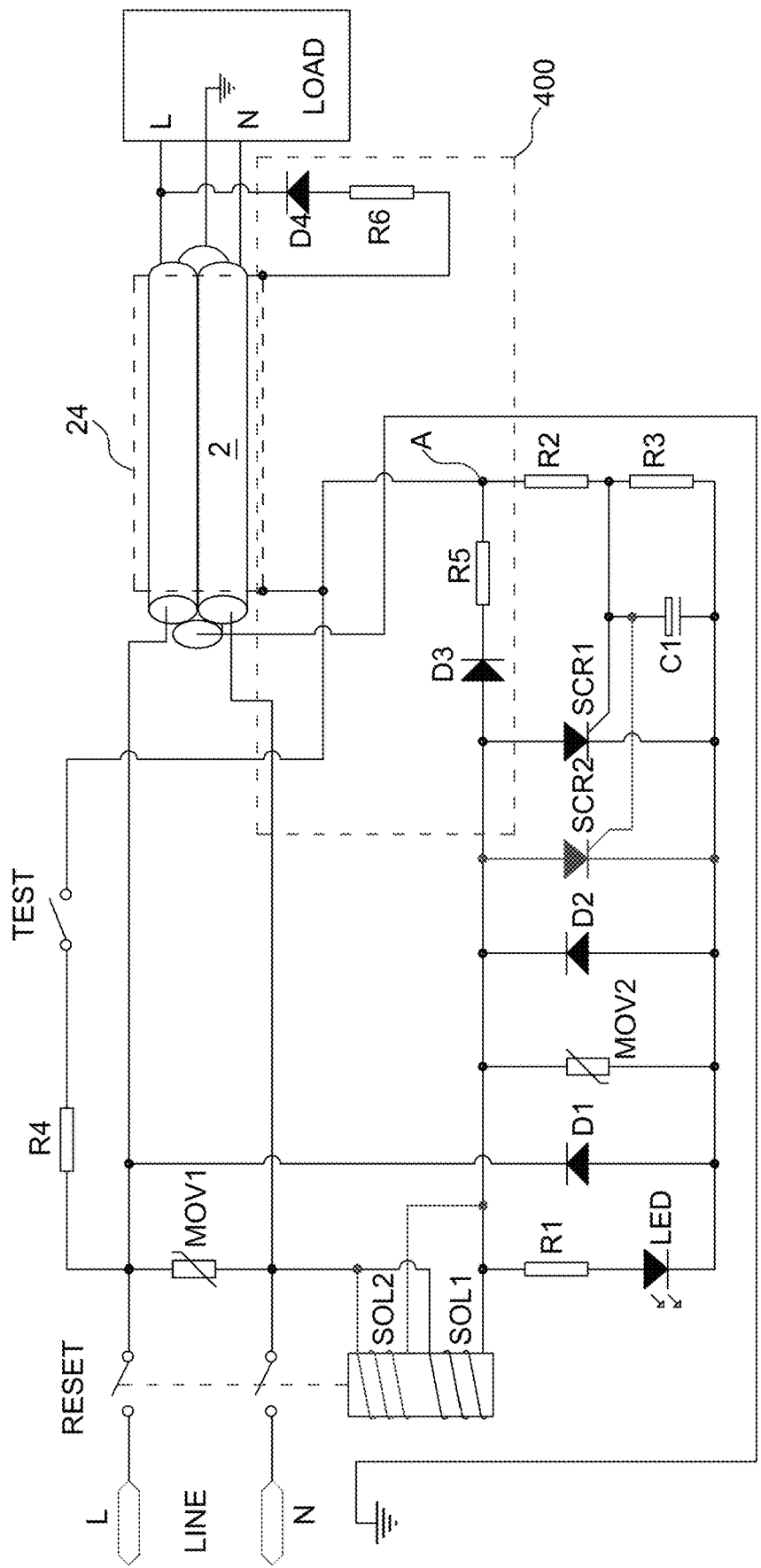
FIG. 7A-7D are circuit diagrams of leakage current detection and protection devices according to ninth to twelfth embodiments of the present invention.
Figure 7B:
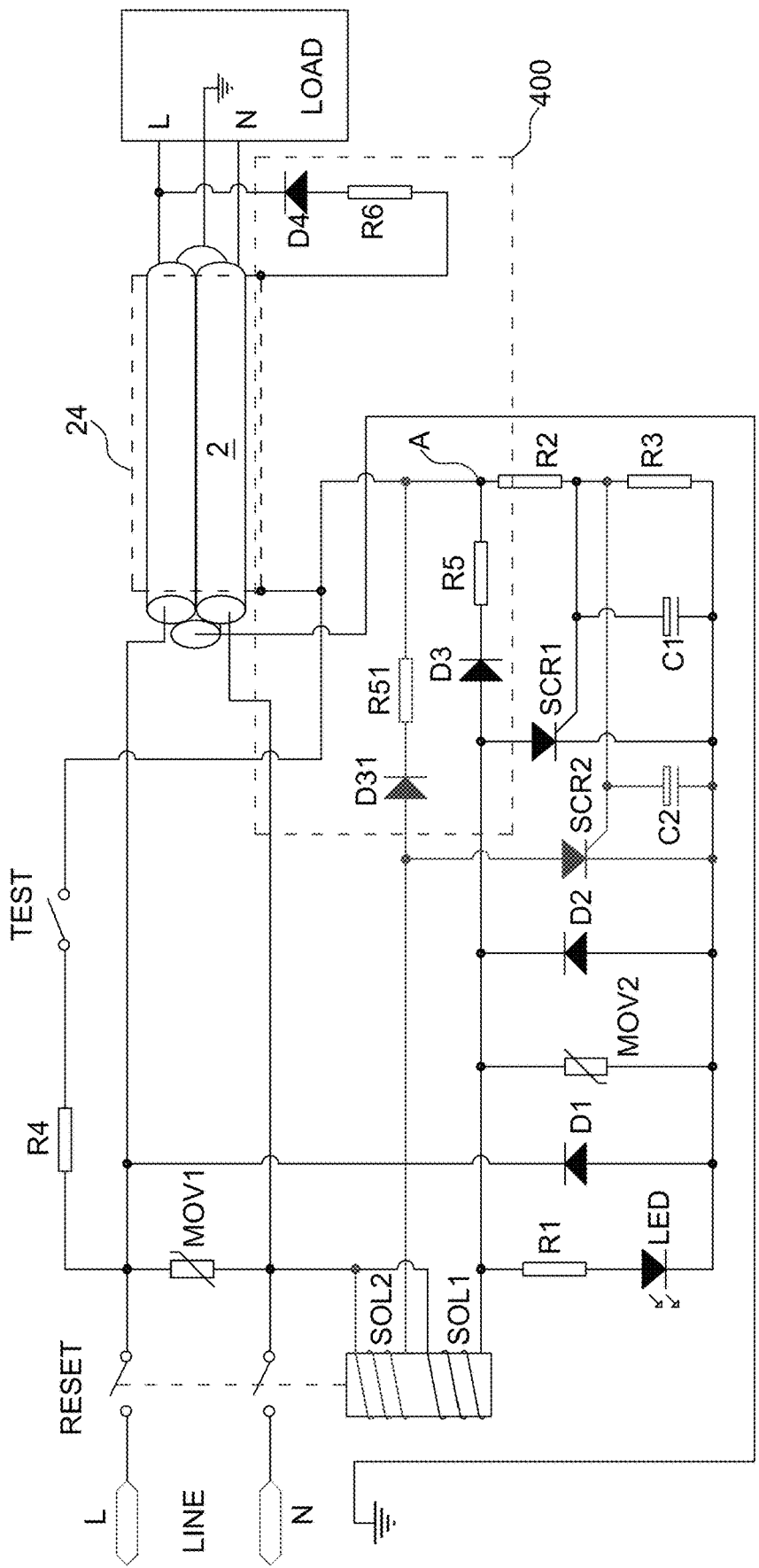
Figure 7C:
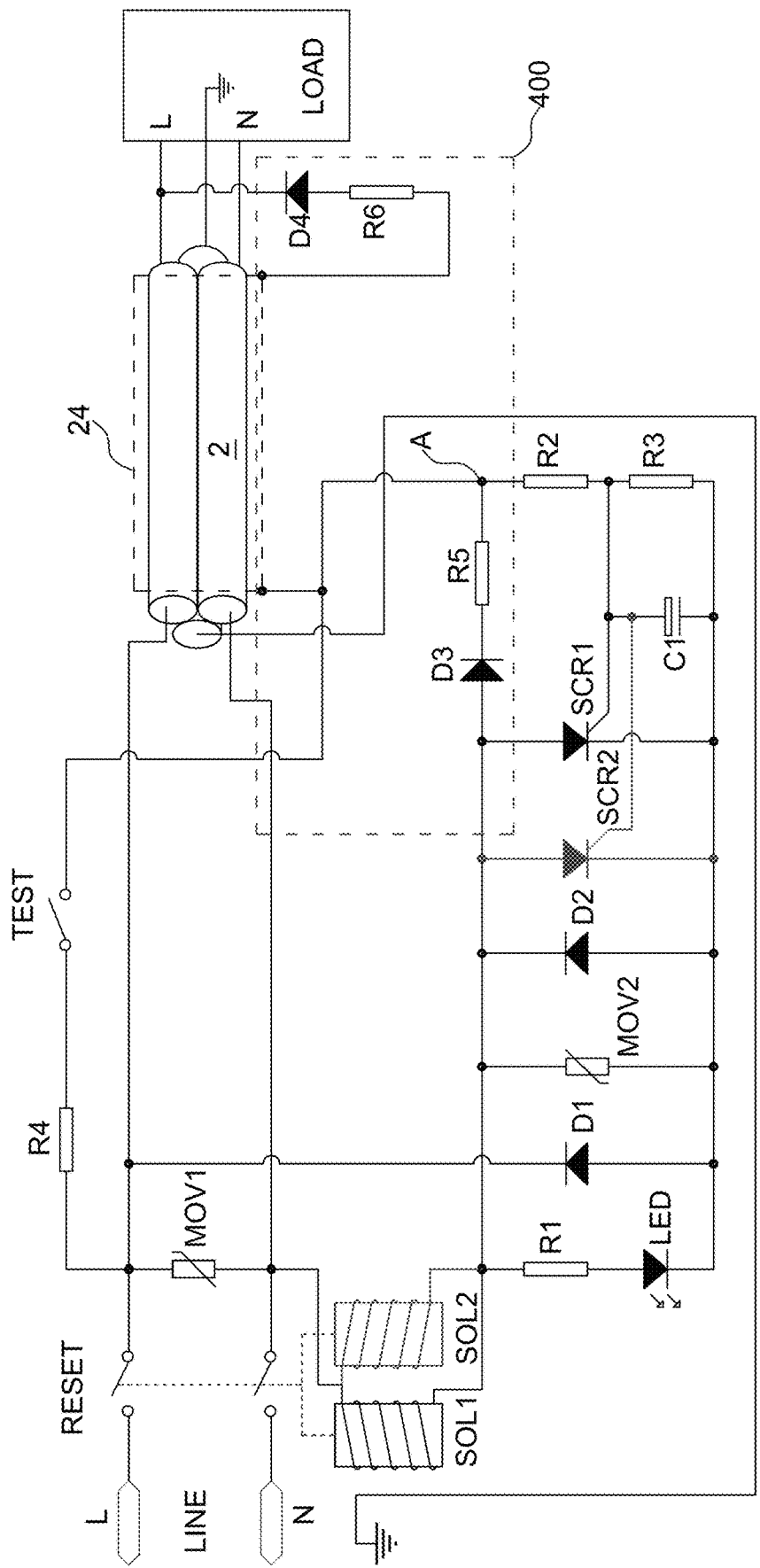
Figure 7D:
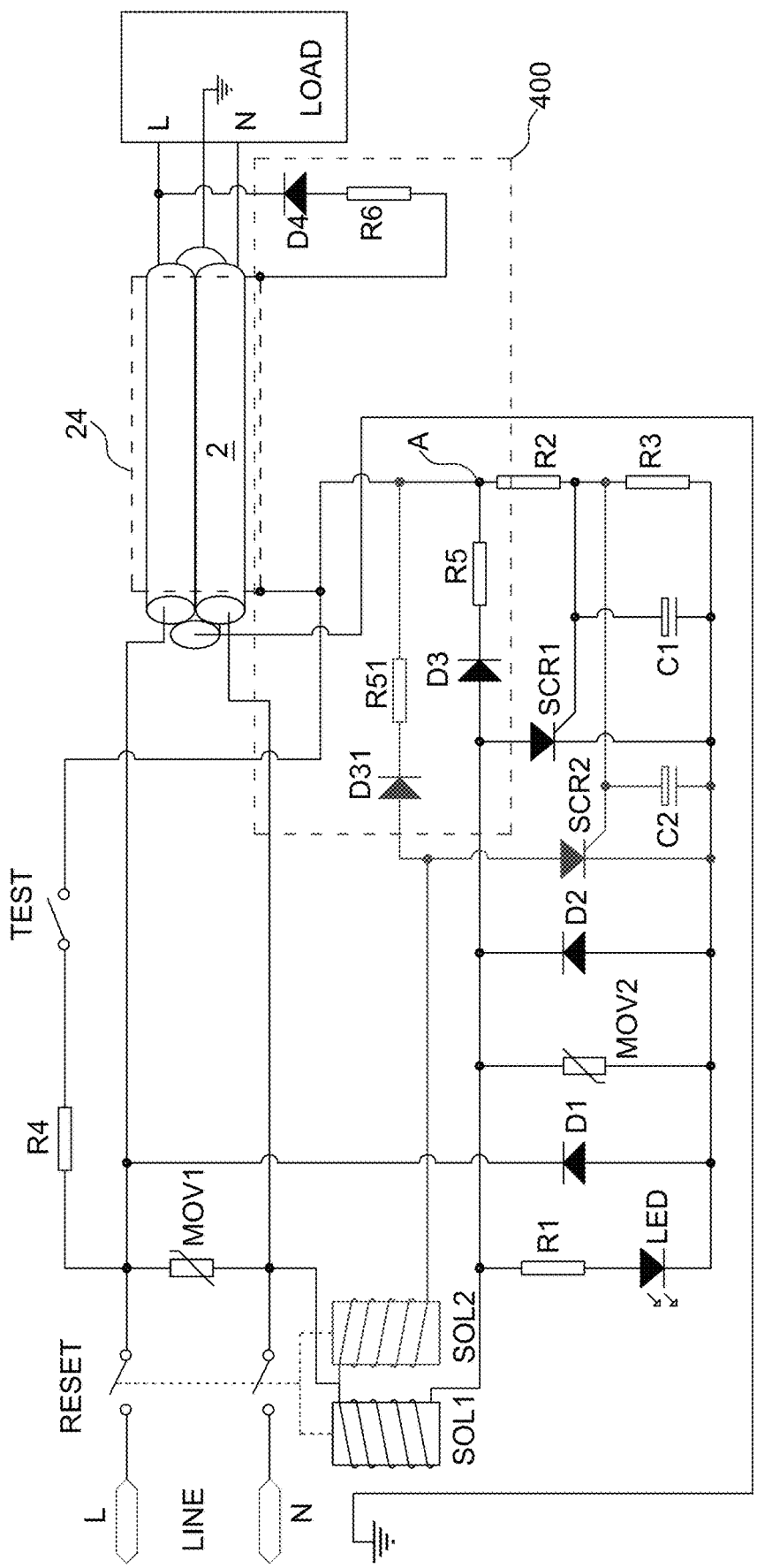

FIG. 7A is a circuit diagram of a leakage current detection and protection device according to a ninth embodiment of the present invention. Similar to the embodiment of FIG. 5A, the open-circuit detection circuit 400 includes a first detection circuit (D4, R6) and a second detection circuit (D3, R5). One difference is that, the device of FIG. 7A does not have a signal feedback line. The first detection circuit is located on the load side, and the leakage current detection line 24 is coupled at its load end to the L line via the first detection circuit. The test switch TEST is directly coupled to resistor R2 of the control circuit without going through the leakage current detection line. Thus, when the shield line 24 has no open-circuit, the point A is limited to a relatively low voltage, so the silicon controlled rectifier assembly is not triggered to conduct, and the device operates normally. But when any location along the shield line 24 has an open-circuit, a current loop is formed from the N line, via the solenoid assembly, the diode D3, the resistors R5, R2 and R3, and the diode D1, to the L line. This current loop triggers the silicon controlled rectifier assembly to become conductive; therefore, the silicon controlled rectifier assembly, the diode D1, and the solenoid assembly form a current loop. As a result, the solenoid assembly generates a magnetic field to cause the device to trip, which cuts off the power. This achieves automatic detection of open-circuit conditions of the leakage current detection line 24. Further, by pressing the test button TEST, open-circuit conditions in other components beside the leakage current detection line can be detected. In a leakage current detection and protection device according to a tenth embodiment shown in FIG. 7B, similar to the embodiment of FIG. 5B, the open-circuit detection circuit 400 includes a first detection circuit (D4, R6) and a second detection circuit (D3, R5). Different from the device of FIG. 5B, the device of FIG. 7B does not have a signal feedback line; the first detection circuit is located on the load side, and the leakage current detection line 24 is coupled at its load end to the L line via the first detection circuit. The test switch TEST is directly coupled to resistor R2 of the control circuit without going through the leakage current detection line, and there is no resistors R21 and R31. This circuit can automatically detect an open-circuit condition at any location along the shield line 24. Further, by pressing the test button TEST, open-circuit conditions in other components beside the leakage current detection line can be detected. The eleventh embodiment shown in FIG. 7C is similar to the embodiment of FIG. 7A, except that the two coils of the solenoid assembly are respectively wound around two separate frames. The power cord leakage current detection and protection device of the twelfth embodiment shown in FIG. 7D is similar to the embodiment of FIG. 7B, except that the two coils of the solenoid assembly are respectively wound around two separate frames.

Figure 8A:
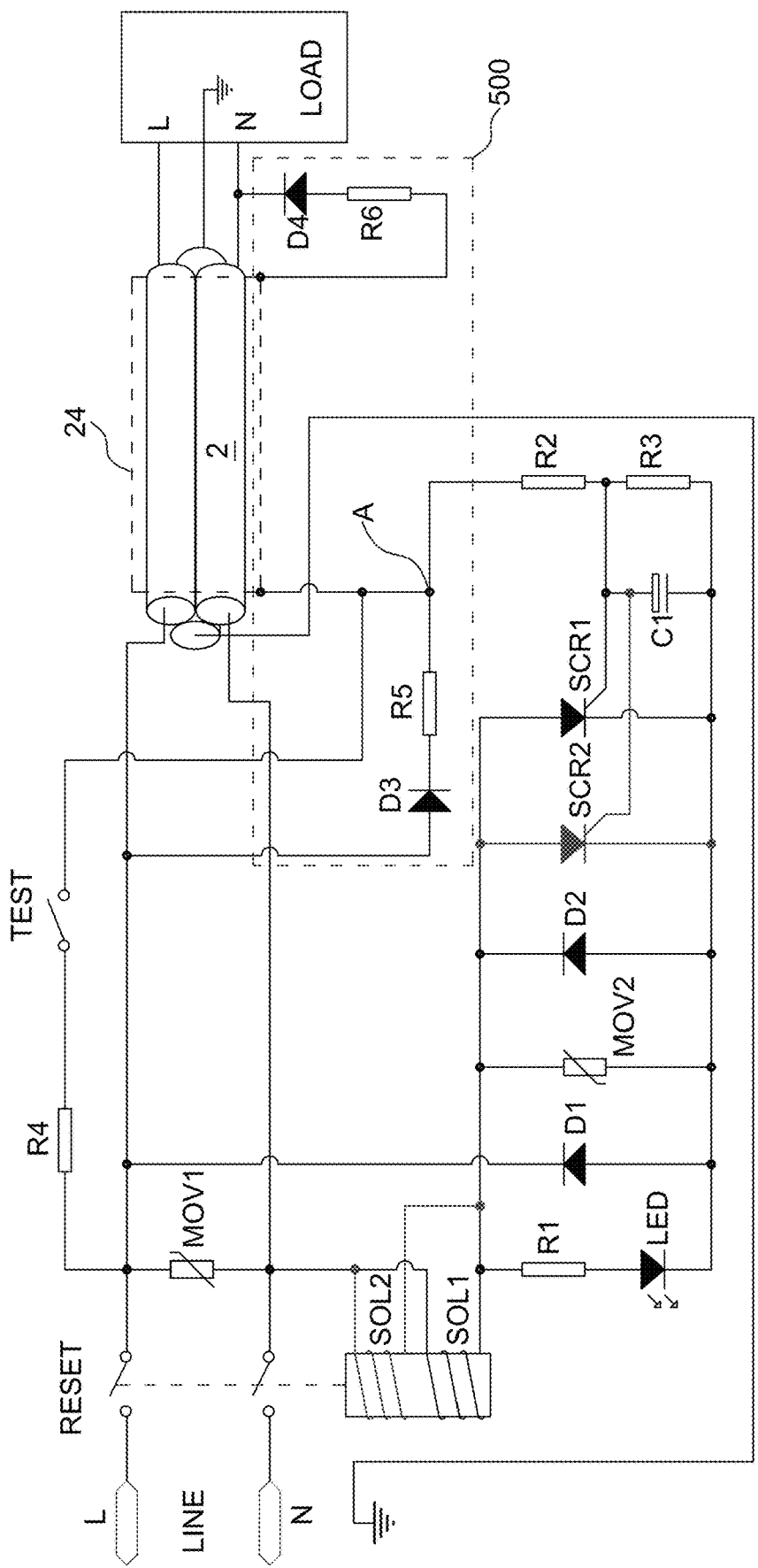
FIG. 8A-8D are circuit diagrams of leakage current detection and protection devices according to thirteenth to sixteenth embodiments of the present invention.
Figure 8B:
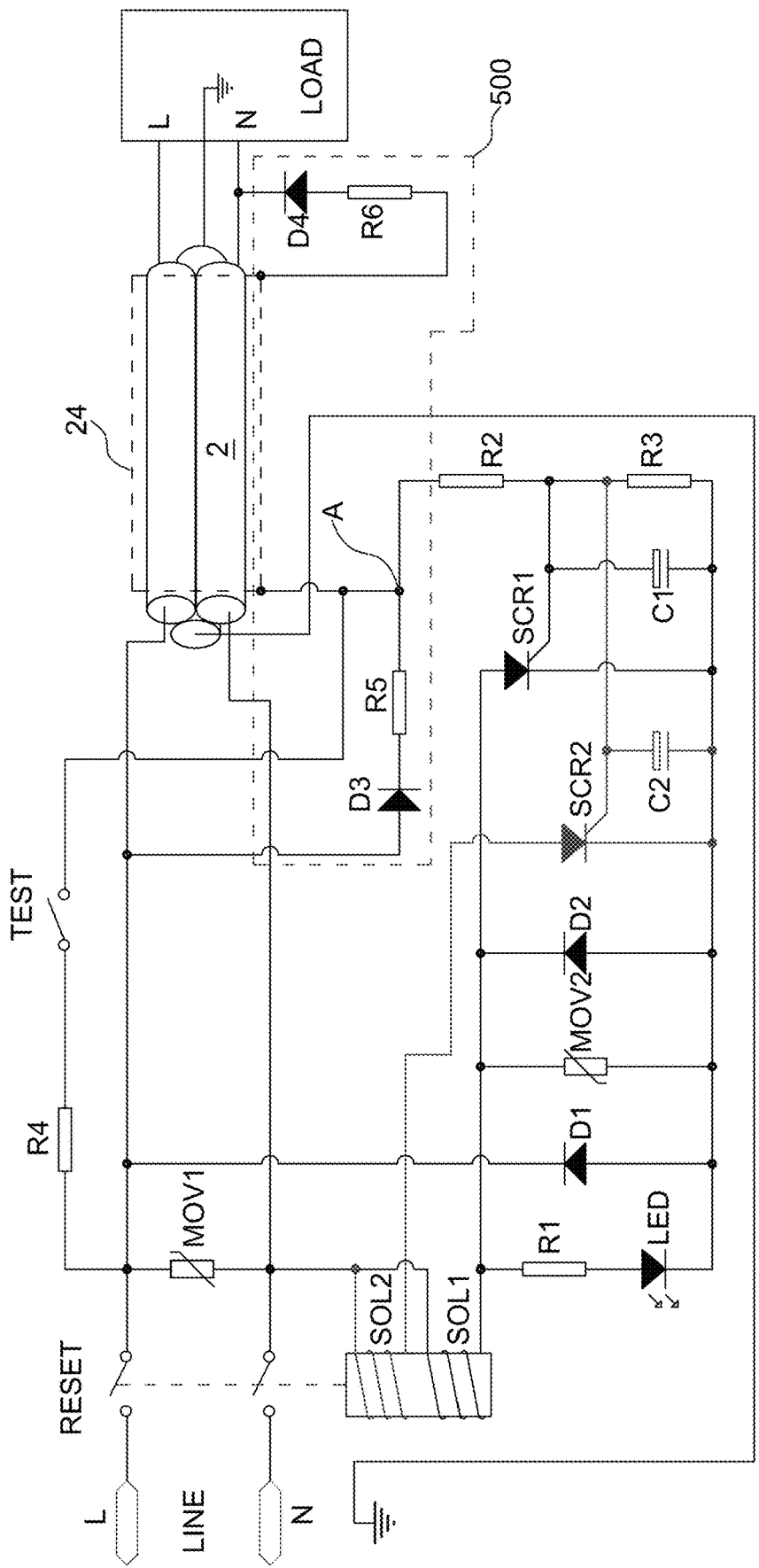
Figure 8C:
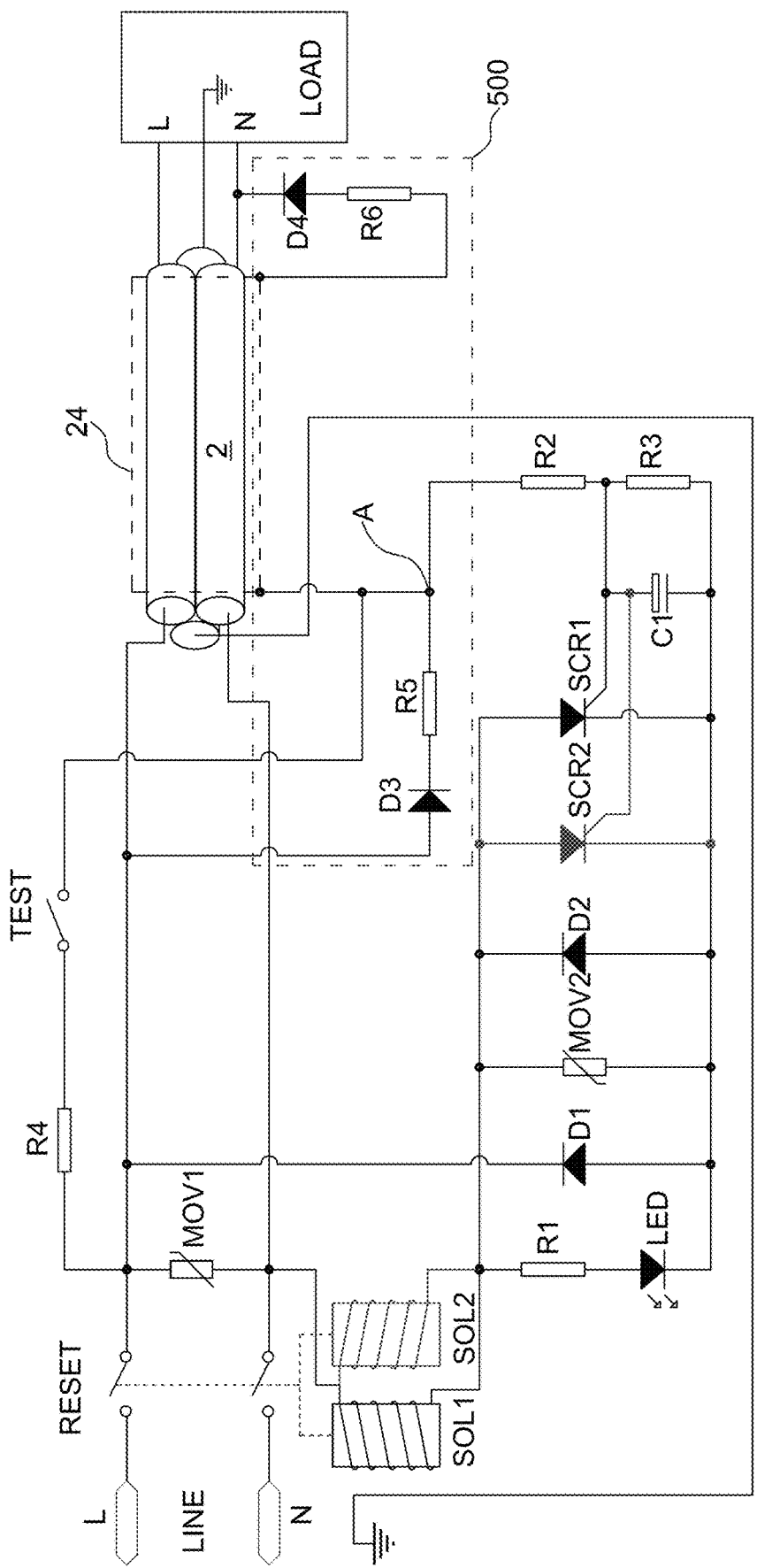
Figure 8D:
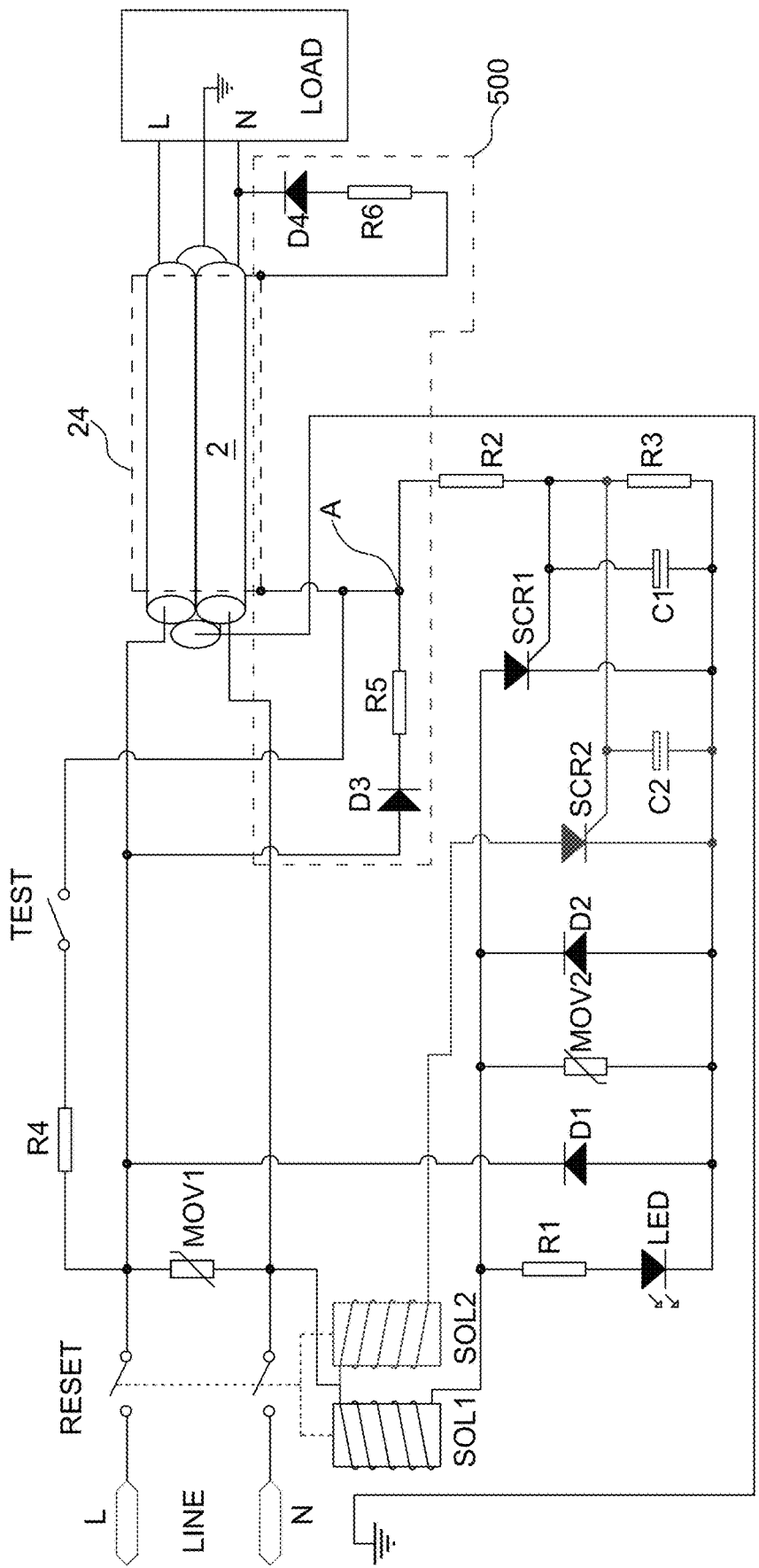

The thirteenth embodiment shown in FIG. 8A is similar to the embodiment of FIG. 6A, but does not have a signal feedback line 25. The first detection circuit (D4, R6) is located on the load side, and the leakage current detection line 24 is coupled at its load end to the N line via the first detection circuit. The test switch TEST is directly coupled to resistor R2 of the control circuit without going through the leakage current detection line. This circuit can automatically detect an open-circuit condition at any location along the shield line 24. Further, by pressing the test button TEST, open-circuit conditions in other components beside the leakage current detection line can be detected. The fourteenth embodiment shown in FIG. 8B is similar to the embodiment of FIG. 6B, one difference being that it does not have a signal feedback line 25; the first detection circuit (D4, R6) is located on the load side, and the leakage current detection line 24 is coupled at its load end to the N line via the first detection circuit. The test switch TEST is directly coupled to resistor R2 of the control circuit without going through the leakage current detection line. This circuit can automatically detect an open-circuit condition at any location along the shield line 24. Further, by pressing the test button TEST, open-circuit conditions in other components beside the leakage current detection line can be detected. The fifteenth embodiment shown in FIG. 8C is similar to the embodiment of FIG. 8A, except that the two coils of the solenoid assembly are respectively wound around two separate frames. The power cord leakage current detection and protection device of the sixteenth embodiment shown in FIG. 8D is similar to the embodiment of FIG. 8B, except that the two coils of the solenoid assembly are respectively wound around two separate frames.

Figure 9A:
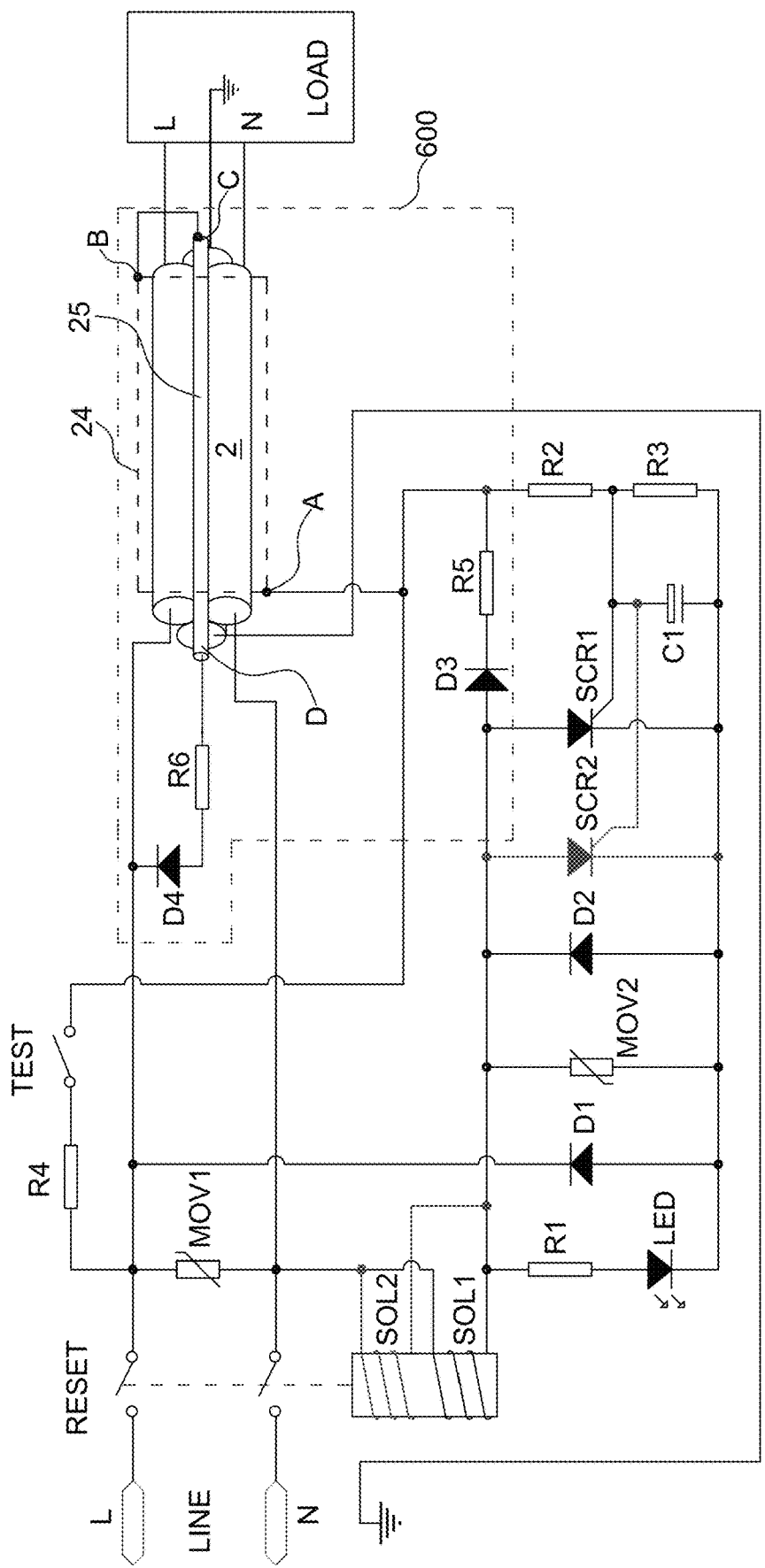
FIG. 9A-9D are circuit diagrams of leakage current detection and protection devices according to seventeenth to twentieth embodiments of the present invention.
Figure 9B:
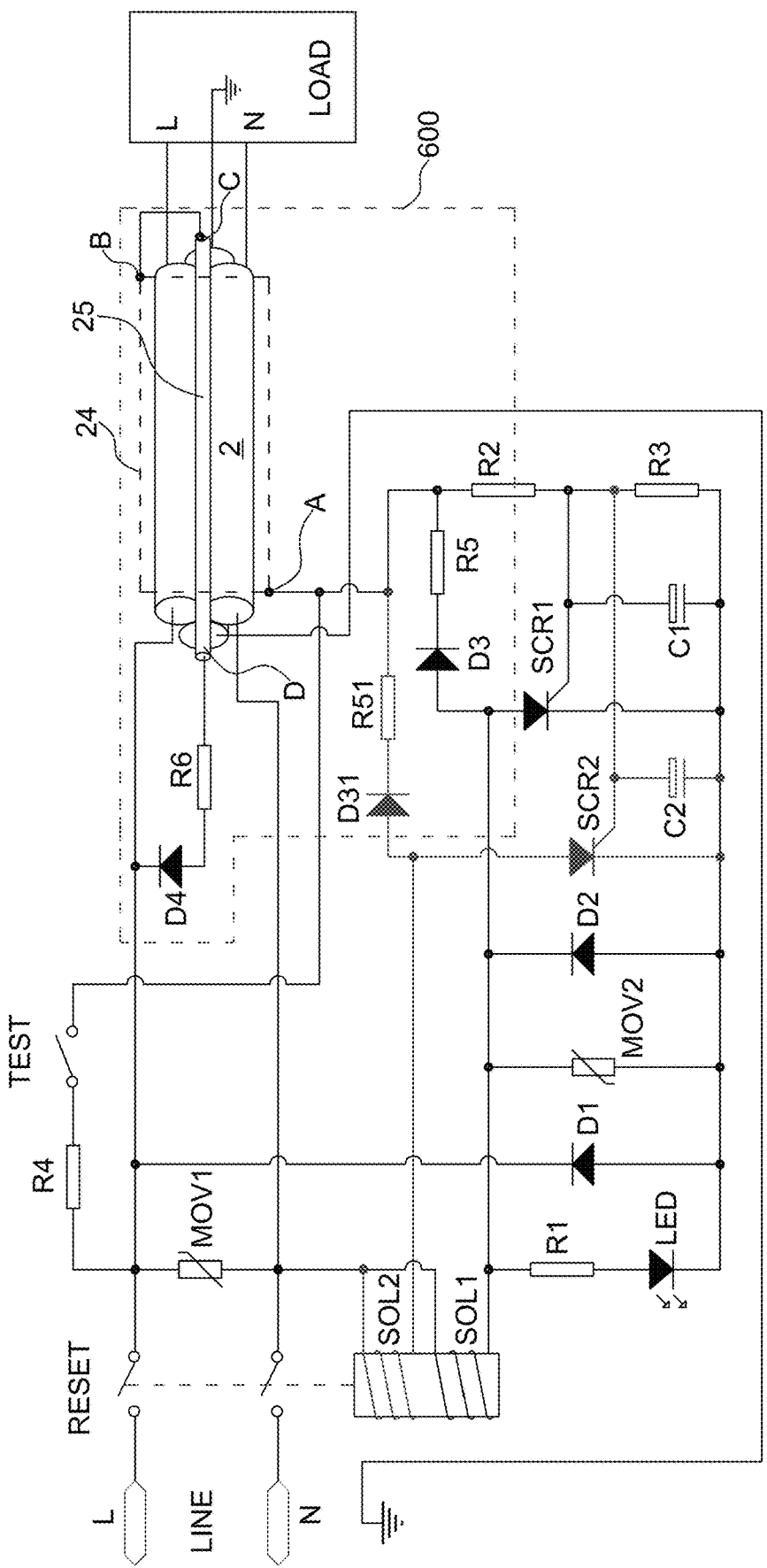
Figure 9C:
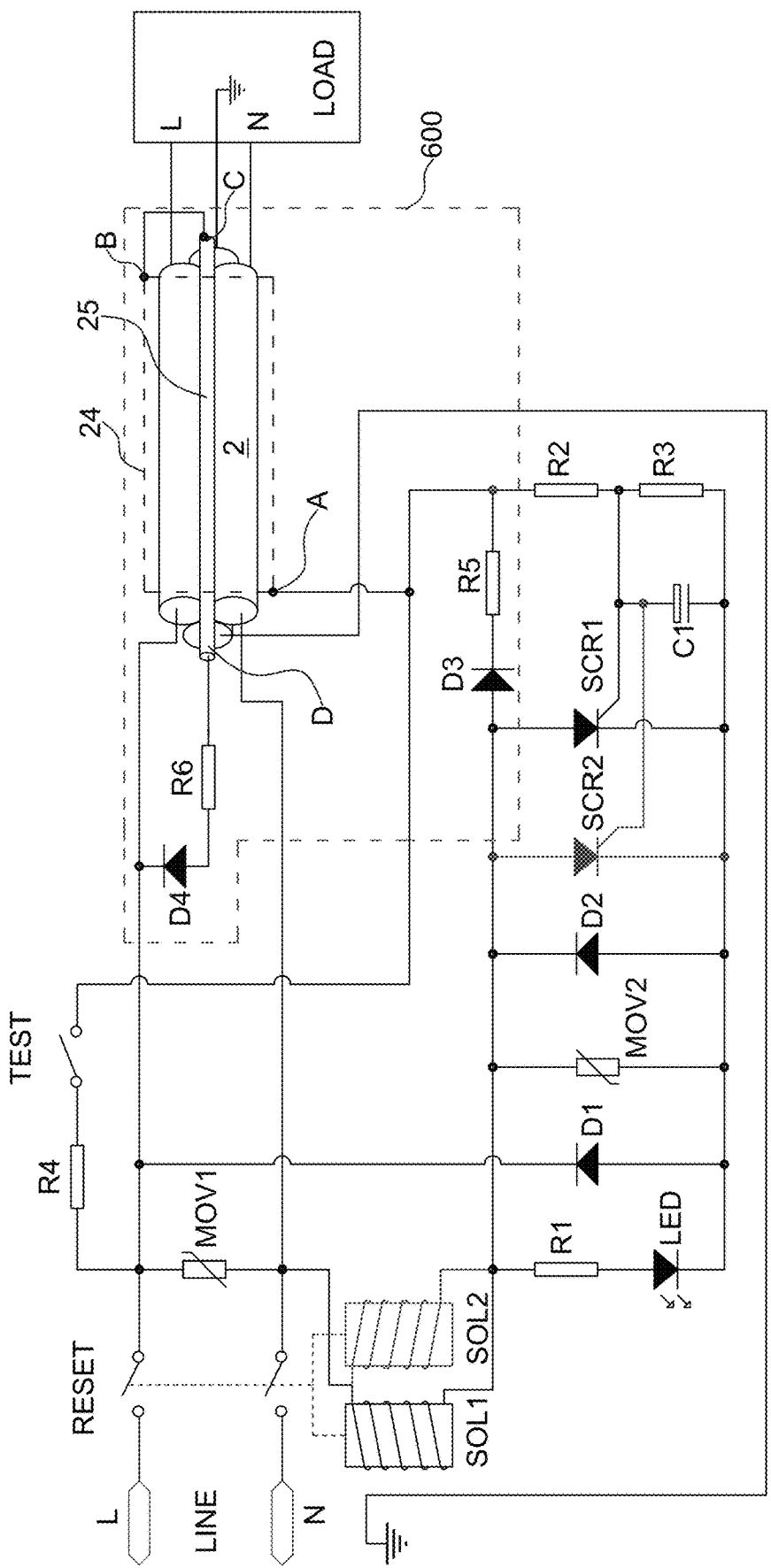
Figure 9D:
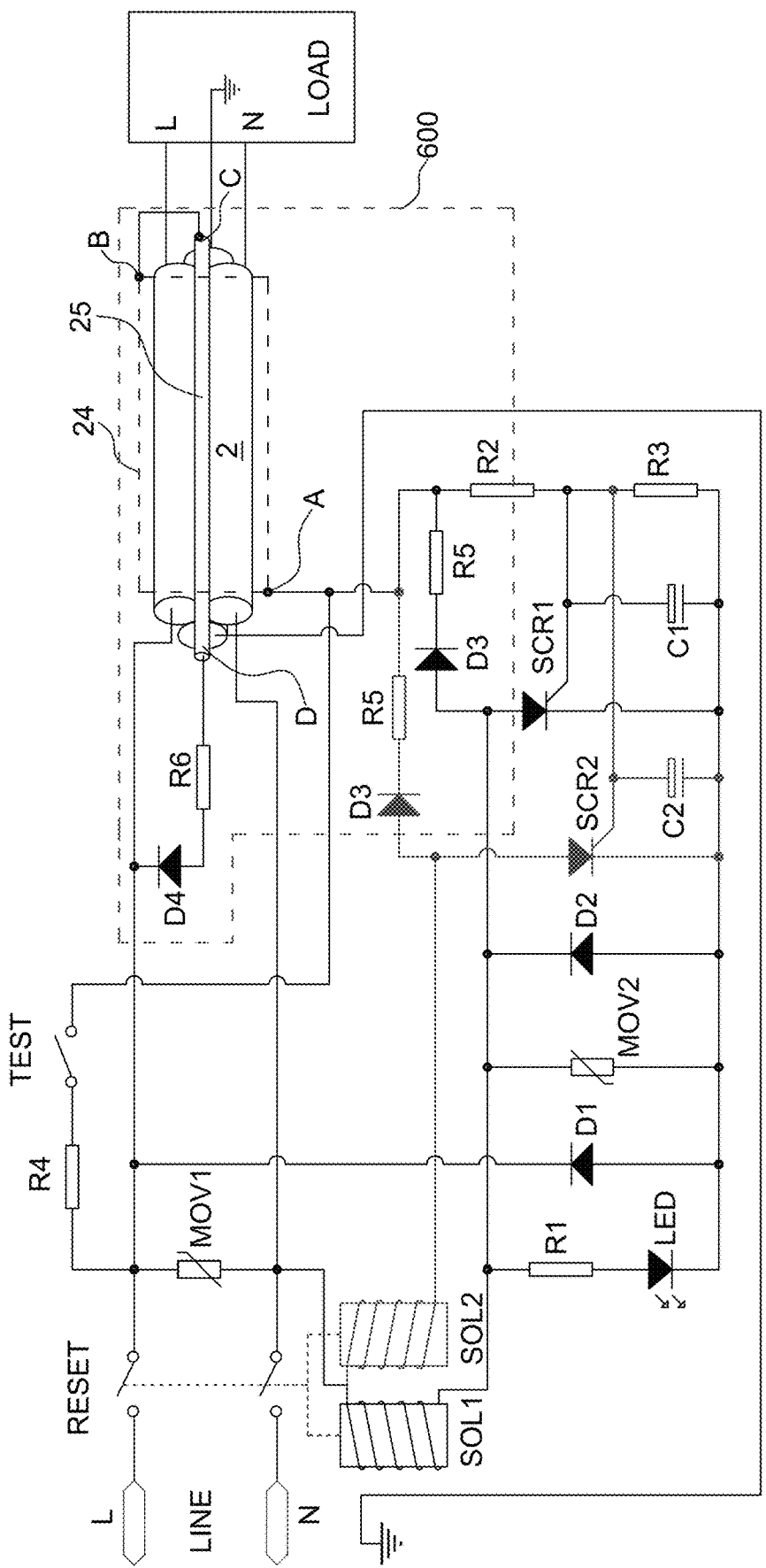
Figure 10A:
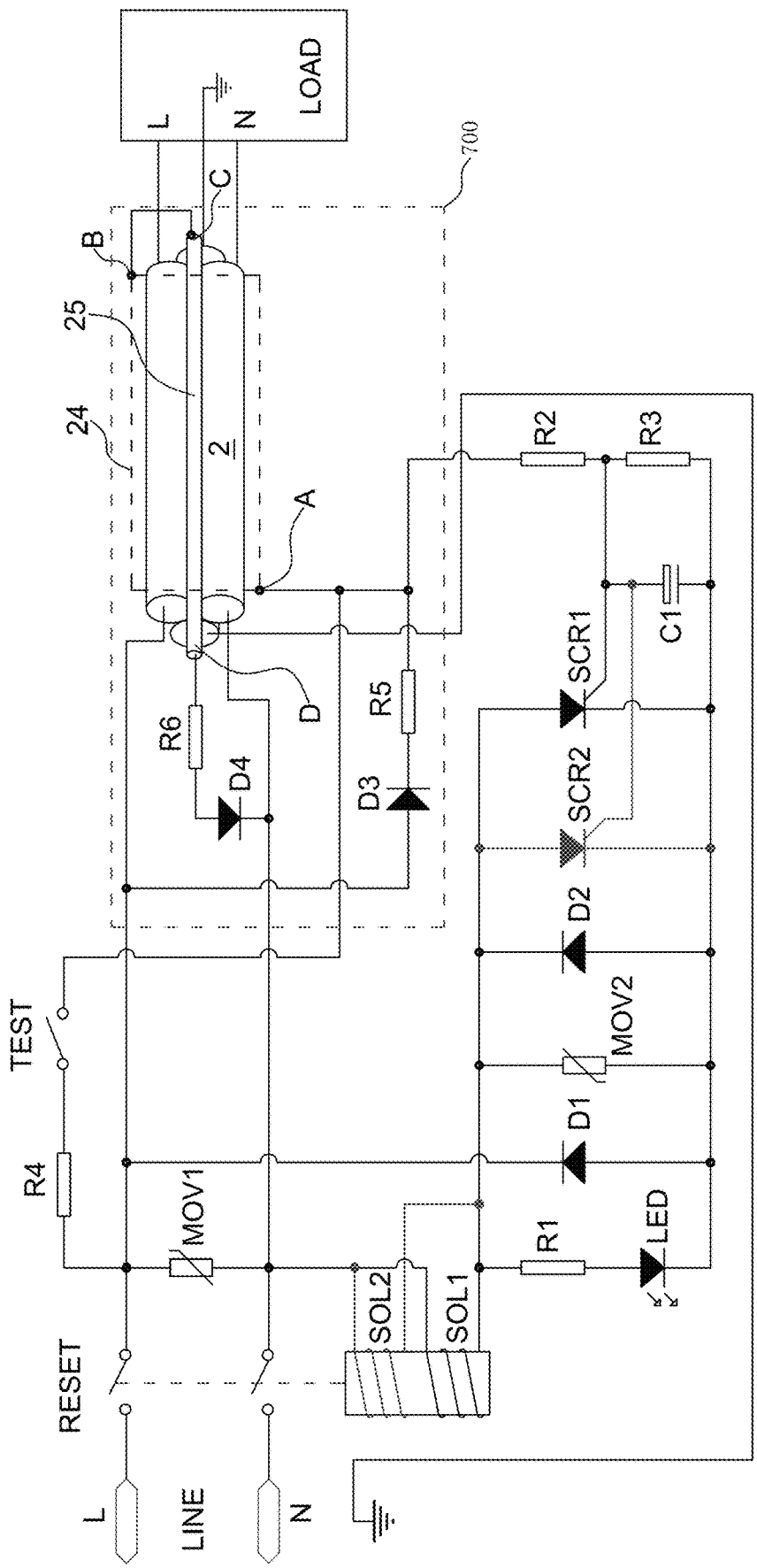
FIG. 10A-10D are circuit diagrams of leakage current detection and protection devices according to twenty-first to twenty-fourth embodiments of the present invention.
Figure 10B:
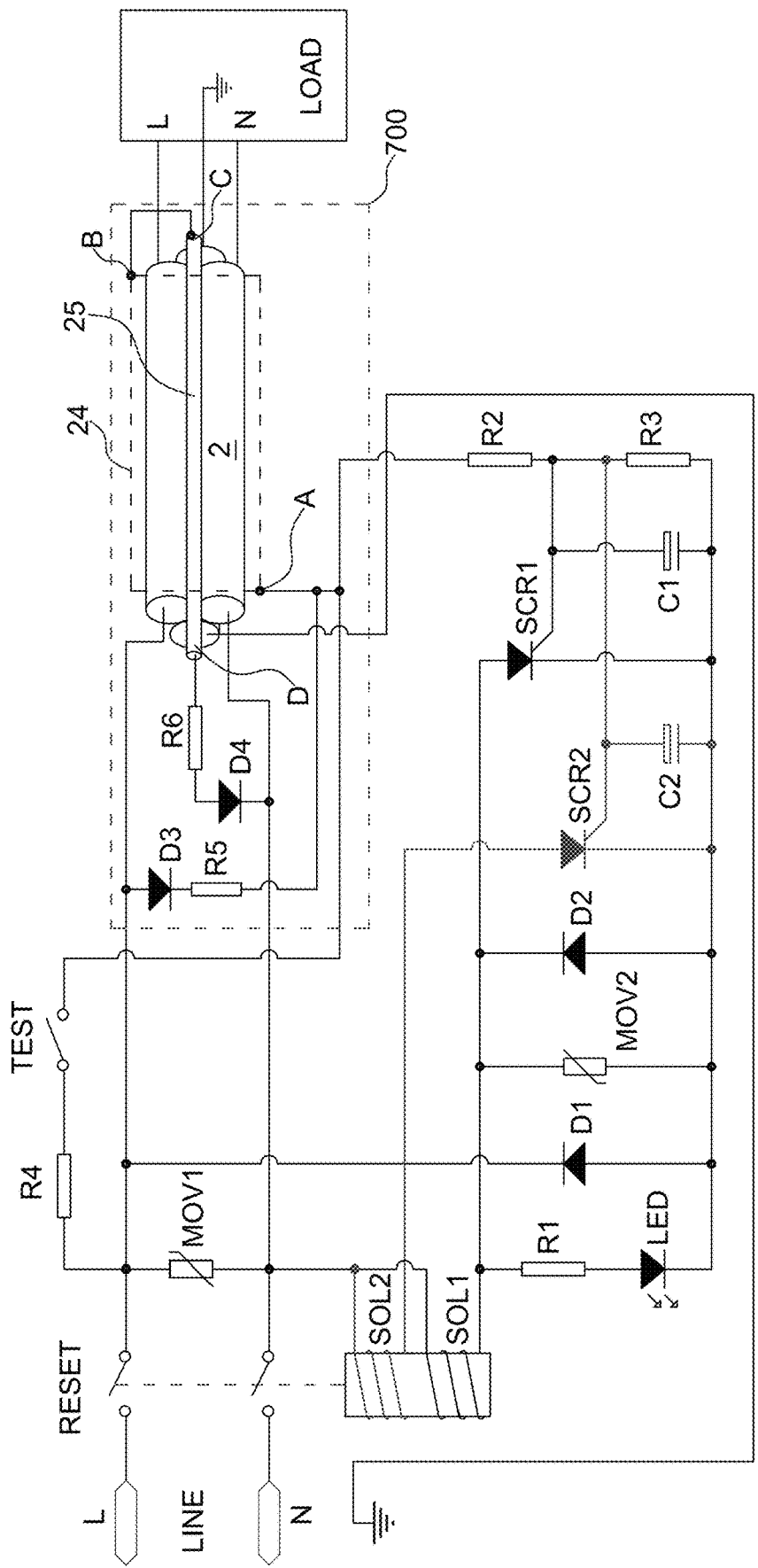
Figure 10C:
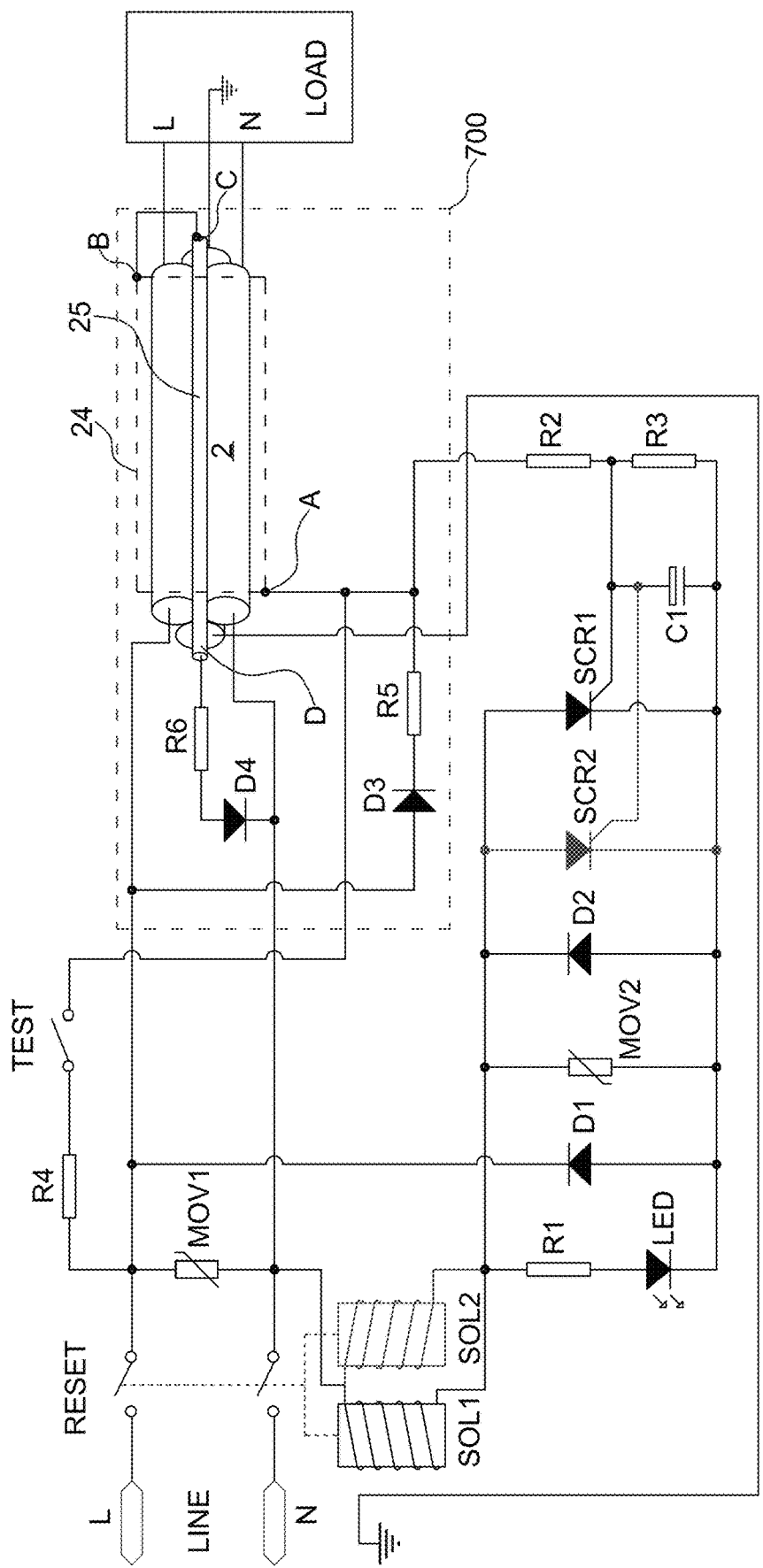
Figure 10D:
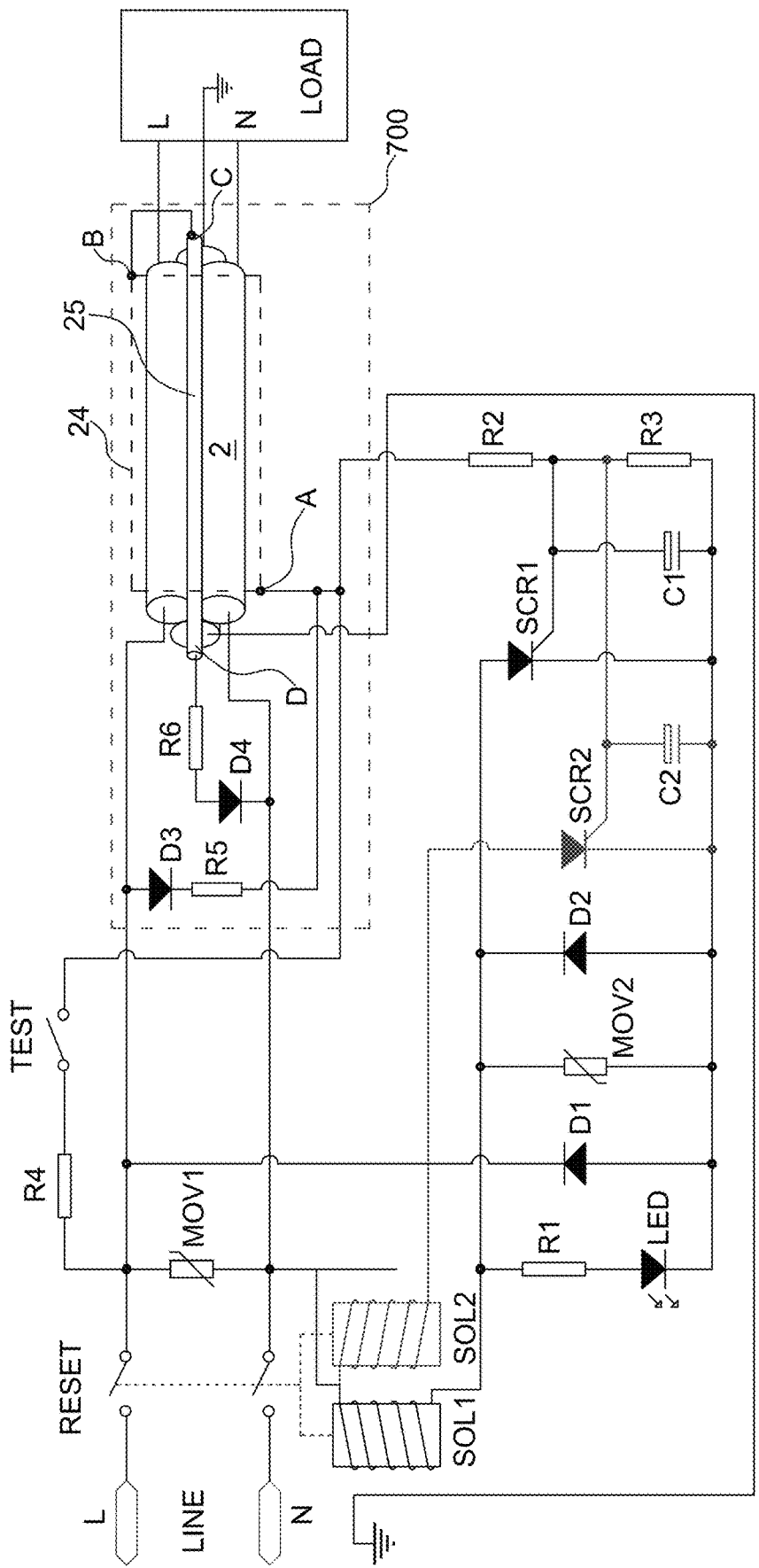

The seventeenth to twentieth embodiments shown in FIGS. 9A to 9D are similar respectively to the first to fourth embodiments shown in FIGS. 5A to 5D, the differences being: the D end the of the leakage current detection line 24 (i.e. the end on the line side) is only coupled to the L line via the first detection circuit (D4, R6); the test switch TEST is directly couple to resistor R2 of the control circuit; and there are no resistors R31 and R21 in FIGS. 9B and 9D. The twenty-first to twenty-fourth embodiments shown in FIGS. 10A to 10D are similar respectively to the fifth to eighth embodiments shown in FIGS. 6A to 6D, the differences being: the D end the of the leakage current detection line 24 (i.e. the end on the line side) is only coupled to the N line via the first detection circuit (D4, R6); and the test switch TEST is directly couple to resistor R2 of the control circuit.

In these embodiments, the first detection circuit (D4, R6) are all located away from the load side, and can be coupled to any point on the L line or N line via the signal feedback line 25. This way, the resistor R6 and diode D4 can be disposed within the body of the power plug 1.

It should be understood that although a silicon controlled rectifier assembly is used in the above embodiments, other silicon device assembly may be used, such as an assembly formed by MOS (metal-oxide-semiconductor) transistors, transistors, or other suitable semiconductor devices which can be used in lieu of silicon controlled rectifiers.

Embodiments of the present invention not only achieve testing of the shield line by manually operating the test switch TEST, they can also automatically detect the shield line open-circuit condition during use of the device, thereby improving safety. Further, by using two or more coils wound on the same or different frames with their current paths in parallel, and by using two or more semiconductor devices with their current paths coupled in parallel, the reliability of the self-testing function is improved. Embodiments of the invention have the additional advantage of simple circuitry and low cost.

It will be apparent to those skilled in the art that various modification and variations can be made in the power cord leakage current detection and protection device and related method of the present invention without departing from the spirit or scope of the invention. Thus, it is intended that the present invention cover modifications and variations that come within the scope of the appended claims and their equivalents.

What is claimed is:

1. A power cord leakage current detection and protection device, comprising:
   a switch unit, configured to control an electrical connection between an input end and an output end of the device;
   a leakage current protection unit, which includes a switch drive module and a leakage current detection circuit, wherein the leakage current detection circuit includes a leakage current detection line, configured to detect whether a leakage current is present on a first power supply line and/or a second power supply line; and
   wherein the switch drive module includes a solenoid assembly and a semiconductor assembly, the solenoid assembly being coupled between the first power supply line and the semiconductor assembly, the solenoid assembly including at least two coils with their current paths coupled in parallel, and the semiconductor assembly includes at least two semiconductor devices with their current paths coupled in parallel;
   wherein when at least one of the coils is not an open-circuit and at least one of the semiconductor devices is not an open-circuit, the switch drive module controls the switch unit to disconnect the electrical connection based on a leakage current signal detected by the leakage current detection circuit.

2. The power cord leakage current detection and protection device of claim 1, further comprising:
   an open-circuit detection circuit, which includes a first detection circuit and a second detection circuit, wherein the leakage current detection line is coupled via the first detection circuit to the second power supply line, and
   wherein the switch drive module is configured to control the switch unit to disconnect the electrical connection in response to the open-circuit detection circuit detecting an open-circuit in the leakage current detection line.

3. The power cord leakage current detection and protection device of claim 2, wherein the solenoid assembly includes a first coil and a second coil with their current paths coupled in parallel, the first and second coils being wound on a same frame or on different respective frames.

4. The power cord leakage current detection and protection device of claim 3, wherein the semiconductor assembly includes a first semiconductor device and a second semiconductor device with their current paths coupled in parallel, and either
   wherein an anode of the first semiconductor device is coupled to an anode of the second semiconductor device, a control electrode of the first semiconductor device and a control electrode of the second semiconductor device are both coupled to a first end of a first capacitor, and a cathode of the first semiconductor device and a cathode of the second semiconductor device are both coupled to a second end of the first capacitor, and the first capacitor is coupled in parallel with a first drive resistor, or
   wherein the open-circuit detection circuit further includes a third detection circuit, the leakage current detection line is coupled to the first power supply line via the third detection circuit, an anode of the first semiconductor device is coupled to the first detection circuit, a cathode of the first semiconductor device is coupled to a first end of a first capacitor, a control electrode of the first semiconductor device is coupled to a second end of the first capacitor, the first capacitor is coupled in parallel to a first drive resistor, an anode of the second semiconductor device is coupled to the third detection circuit, a control electrode of the second is coupled to a first end of a second capacitor, and a cathode of the second is coupled to a second end of the second capacitor, and the second capacitor is coupled in parallel to a second drive resistor.

5. The power cord leakage current detection and protection device of claim 4, wherein the first detection circuit includes a first resistor and a first diode coupled in series, and the second detection circuit includes a second resistor and a second diode coupled in series.

6. The power cord leakage current detection and protection device of claim 5, wherein the third detection circuit includes a third resistor and a third diode coupled in series.

7. The power cord leakage current detection and protection device of claim 2, further comprising a signal feedback line, wherein the leakage current detection line is coupled to the first detection circuit via the signal feedback line,
   wherein when the signal feedback line has an open-circuit, the switch drive module controls the switch unit to disconnect the electrical connection.

8. The power cord leakage current detection and protection device of claim 7, further comprising a test unit which includes a test switch, wherein the test switch is coupled to the semiconductor assembly either directly or via the signal feedback line,
   wherein when the test switch is closed, the switch drive module controls the switch unit to disconnect the electrical connection.

9. The power cord leakage current detection and protection device of claim 2, further comprising a test unit which includes a test switch, wherein the test switch is coupled directly to the semiconductor assembly,
   wherein when the test switch is closed, the switch drive module controls the switch unit to disconnect the electrical connection.

10. The power cord leakage current detection and protection device of claim 2, further comprising a housing, configured to accommodate at least one of the switch unit, the leakage current protection unit and the open-circuit detection circuit.

11. The power cord leakage current detection and protection device of claim 1, wherein the semiconductor devices include any of silicon controlled rectifiers, MOS (metal-oxide-semiconductor) transistors, and transistors.

12. An electrical appliance, comprising the power cord leakage current detection and protection device of claim 1.

13. A power cord, comprising:
a first power supply line;
a second power supply line;
a ground line;
a leakage current detection line;
at least one signal feedback lines; and
an insulating cover,
wherein each of the at least one signal feedback lines includes a conductor line and an insulating layer covering the conductor line, wherein the insulating layer covers only the corresponding conductor line without covering any conductor line of any other signal feedback line and without covering any of the first power supply line, the second power supply line and the ground line, where the leakage current detection line covers at least the first and second power supply lines, and the insulating cover covers the leakage current detection line and the at least one signal feedback lines.

14. A power cord leakage current detection and protection device, comprising:
a switch unit, configured to control an electrical connection between an input end and an output end of the device;
a leakage current protection unit, which includes a switch drive module and a leakage current detection circuit, the switch drive module configured to control the switch unit based on a leakage current signal detected by the leakage current detection circuit, wherein the leakage current detection circuit includes:
a leakage current detection line, configured to detect whether a leakage current is present on a first power supply line and/or a second power supply line; and
a signal feedback line, configured to detect whether the leakage current detection line has an open circuit;
wherein the switch drive module includes a solenoid assembly and a semiconductor assembly, the solenoid assembly being coupled between the first power supply line and the semiconductor assembly, the solenoid assembly including at least two coils with their current paths coupled in parallel, and the semiconductor assembly includes at least two semiconductor devices with their current paths coupled in parallel; and
a test unit, including a test switch, coupled to the a leakage current protection unit, wherein when the test switch is closed, the switch drive module controls the switch unit based on a signal on the signal feedback line.

15. The power cord leakage current detection and protection device of claim 14, wherein at least the test unit and the leakage current protection unit form a first test current loop, wherein when the test switch is closed, the switch drive module controls the switch unit to disconnect the electrical connection.

16. The power cord leakage current detection and protection device of claim 14, further comprising:
an open circuit detection unit, which includes a first detection circuit and a second detection circuit, wherein the signal feedback line is coupled via the first detection circuit to one of the first power supply line and the second power supply line, and the leakage current detection line is coupled via the second detection circuit to another one of the first power supply line and the second power supply line; and
wherein at least the first detection circuit and the leakage current protection unit form a second test current loop, the second test current loop configured to cause the switch drive module to control the switch unit to disconnect the electrical connection when at least one of the first detection circuit, the leakage current detection line and the signal feedback line has an open circuit.

17. The power cord leakage current detection and protection device of claim 16, wherein the first detection circuit includes a first resistor and a first diode connected in series, and the second detection circuit includes a second resistor and a second diode connected in series.

18. The power cord leakage current detection and protection device of claim 16, further comprising:
a housing, for accommodating at least one of the switch unit, the leakage current protection unit, the test unit and the open circuit detection unit.

19. A power cord leakage current detection and protection device, comprising:
a switch unit, configured to control electrical connection between an input end and an output end of the device;
a leakage current protection unit, which includes a switch drive module and a leakage current detection circuit, the switch drive module configured to control the switch unit based on a leakage current signal detected by the leakage current detection circuit, wherein the leakage current detection circuit includes:
a leakage current detection line, configured to detect whether a leakage current is present on a first power supply line and/or a second power supply line;
wherein the switch drive module includes a solenoid assembly and a semiconductor assembly, the solenoid assembly being coupled between the first power supply line and the semiconductor assembly, the solenoid assembly including at least two coils with their current paths coupled in parallel, and the semiconductor assembly includes at least two semiconductor devices with their current paths coupled in parallel; and
an open circuit detection unit, which includes a first detection circuit and a second detection circuit, wherein the leakage current detection line is coupled via the first detection circuit to one of the first power supply line and the second power supply line, and the second detection circuit is coupled to another one of the first power supply line and the second power supply line;
wherein at least the first detection circuit and the leakage current protection unit form a test current loop, the test current loop configured to cause the switch drive module to control the switch unit to disconnect the electrical connection when the first detection circuit and/or the leakage current detection line has an open circuit.

20. The power cord leakage current detection and protection device of claim 19, wherein the first detection circuit includes a first resistor and a first diode connected in series, and the second detection circuit includes a second resistor and a second diode connected in series.

21. The power cord leakage current detection and protection device of claim 19, further comprising:
a signal feedback line, wherein the leakage current detection line is coupled via the signal feedback line to the first detection circuit, wherein the first detection circuit is located at a distance away from the output end.

22. The power cord leakage current detection and protection device of claim 19, further comprising:
a housing, for accommodating at least one of the switch unit, the leakage current protection unit, and the open circuit detection unit.

23. An electrical appliance, comprising the power cord leakage current detection and protection device of claim 14.

* * * * *